US012625931B2

(12) United States Patent
Cheng et al.

(10) Patent No.: US 12,625,931 B2
(45) **Date of Patent: \*May 12, 2026**

(54) COMPUTER-BASED SYSTEMS HAVING COMPONENTS CONFIGURED/PROGRAMMED FOR VIDEO PASSWORD BASED AUTHENTICATION AND METHODS OF USE THEREOF

(71) Applicant: Capital One Services, LLC, McLean, VA (US)

(72) Inventors: Lin Ni Lisa Cheng, New York, NY (US); Tyler Maiman, Melville, NY (US); Joshua Edwards, Philadelphia, PA (US); Shabnam Kousha, Washington, DC (US); Asher Smith-Rose, Midlothian, VA (US)

(73) Assignee: Capital One Services, LLC, McLean, VA (US)

( \* ) Notice: Subject to any disclaimer, the term of this patent is extended or adjusted under 35 U.S.C. 154(b) by 16 days.

This patent is subject to a terminal disclaimer.

(21) Appl. No.: 18/773,139

(22) Filed: Jul. 15, 2024

(65) Prior Publication Data

US 2024/0370538 A1     Nov. 7, 2024

Related U.S. Application Data

(63) Continuation of application No. 17/733,393, filed on Apr. 29, 2022, now Pat. No. 12,039,018.

(51) Int. Cl.
*G06F 21/31* (2013.01)
*G06N 3/08* (2023.01)

(52) U.S. Cl.
CPC ............... *G06F 21/31* (2013.01); *G06N 3/08* (2013.01); *G06F 2221/2117* (2013.01)

(58) Field of Classification Search
CPC .. G06F 21/31; G06F 21/36; G06F 2221/2117; G06N 3/08
USPC .......................................................... 726/19
See application file for complete search history.

(56) References Cited

U.S. PATENT DOCUMENTS

| | | | |
|---|---|---|---|
| 9,336,373 | B2 | 5/2016 | Ramachandran et al. |
| 10,460,096 | B2 | 10/2019 | Hong et al. |
| 10,467,394 | B2 | 11/2019 | Asulin et al. |
| 10,587,594 | B1 | 3/2020 | McClintock |
| 11,868,942 | B2 | 1/2024 | Jagannathan |

*Primary Examiner* — Benjamin A Kaplan
(74) *Attorney, Agent, or Firm* — GREENBERG TRAURIG, LLP

(57) ABSTRACT

Systems and methods of video password based user authentication via machine learning techniques are disclosed. In one embodiment, an exemplary computer-implemented method may comprise: receiving a request to register a video password from a first user; establishing at least one user-specific authentication criterion for the first user based on first video password data; receiving a login attempt from a second computing device associated with a second user who submits to be the first user, the login attempt comprising second video password data; utilizing a trained video password authentication machine learning model to determine a first comparison result and a second comparison result based on the first and second video password data, and accepting or rejecting the login attempt based on at least one of the first comparison result and the second comparison result.

20 Claims, 8 Drawing Sheets

100

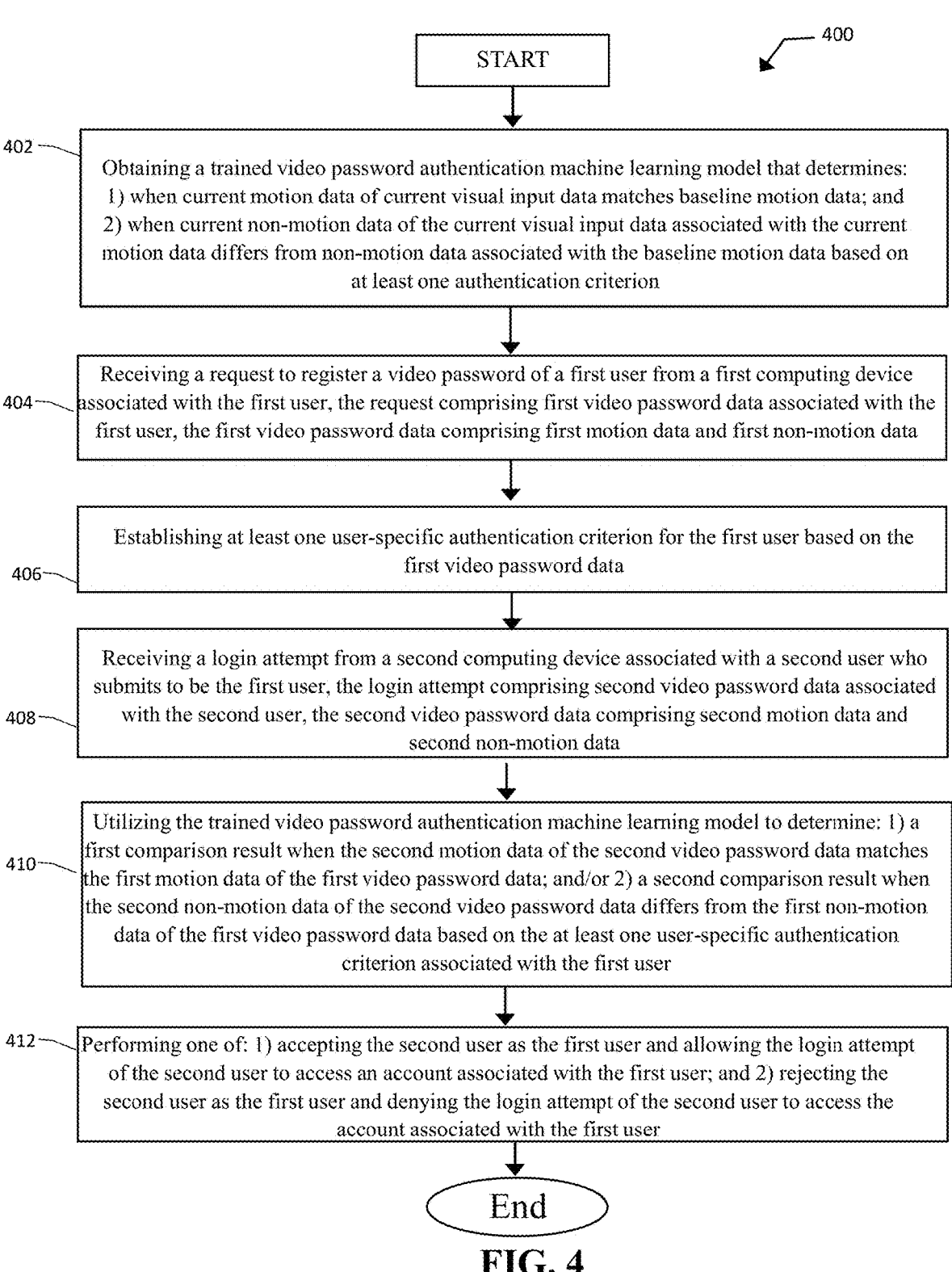

START

400

402 — Obtaining a trained video password authentication machine learning model that determines:
1) when current motion data of current visual input data matches baseline motion data; and
2) when current non-motion data of the current visual input data associated with the current
motion data differs from non-motion data associated with the baseline motion data based on
at least one authentication criterion 404 — Receiving a request to register a video password of a first user from a first computing device
associated with the first user, the request comprising first video password data associated with the
first user, the first video password data comprising first motion data and first non-motion data 406 — Establishing at least one user-specific authentication criterion for the first user based on the
first video password data 408 — Receiving a login attempt from a second computing device associated with a second user who
submits to be the first user, the login attempt comprising second video password data associated
with the second user, the second video password data comprising second motion data and
second non-motion data 410 — Utilizing the trained video password authentication machine learning model to determine: 1) a
first comparison result when the second motion data of the second video password data matches
the first motion data of the first video password data; and/or 2) a second comparison result when
the second non-motion data of the second video password data differs from the first non-motion
data of the first video password data based on the at least one user-specific authentication
criterion associated with the first user 412 — Performing one of: 1) accepting the second user as the first user and allowing the login attempt
of the second user to access an account associated with the first user; and 2) rejecting the
second user as the first user and denying the login attempt of the second user to access the
account associated with the first user End

FIG. 4

COMPUTER-BASED SYSTEMS HAVING COMPONENTS CONFIGURED/PROGRAMMED FOR VIDEO PASSWORD BASED AUTHENTICATION AND METHODS OF USE THEREOF

COPYRIGHT NOTICE

FIELD OF TECHNOLOGY

The present disclosure generally relates to improved computer-implemented methods, improved computer-based platforms or systems, improved computing components and devices configured for one or more practical technological improvement applications utilizing one or more machine learning techniques to authenticate user identities, including, but not limited to, via video passwords.

BACKGROUND OF TECHNOLOGY

A computer network platform/system may include a group of computers (e.g., clients, servers, computing clusters, cloud resources, etc.) and other computing hardware devices that are linked and communicate via software architecture, communication applications, and/or software applications associated with electronic transactions, data processing, and/or service management. For example, without limitation, a popular technique allowing users access to protected digital resources (e.g., an emails, a locked screen display) requires user identity authentication based on registered user credential information such as a username paired with a password. However, at least one technological problem is that the pair of username and password online/electronic/digital authentication technique is typically a subject of a tradeoff between providing secure identity authentication (e.g., less susceptible to various security attacks that may steal login credentials) while not over-burdening the user by the process of authentication (e.g., remembering a password too complicated, relying on a technologically advanced computing device to store an additional hardware/software token, or detect various biometrical information via sensors).

SUMMARY OF DESCRIBED SUBJECT MATTER

In some embodiments, the present disclosure provides various exemplary technically improved computer-implemented methods involving user authentication, the method including steps such as: obtaining, by one or more processors, a trained video password authentication machine learning model that determines: 1) when current motion data of current visual input data matches baseline motion data, and 2) when current non-motion data of the current visual input data associated with the current motion data differs from non-motion data associated with the baseline motion data based on at least one authentication criterion; receiving, by the one or more processors, a request to register a video password of a first user from a first computing device associated with the first user, the request comprising first video password data associated with the first user, the first video password data comprising: 1) first motion data, and 2) first non-motion data; establishing, by the one or more processors, at least one user-specific authentication criterion for the first user based on the first video password data; receiving, by the one or more processors, a login attempt from a second computing device associated with a second user who submits to be the first user, the login attempt comprising second video password data associated with the second user, the second video password data comprising: 1) second motion data, and 2) second non-motion data; utilizing, by the one or more processors, the trained video password authentication machine learning model to: determine a first comparison result when the second motion data of the second video password data matches the first motion data of the first video password data, and determine a second comparison result when the second non-motion data of the second video password data differs from the first non-motion data of the first video password data based on the at least one user-specific authentication criterion associated with the first user; and performing, by the one or more processors, one of: accepting the second user as the first user and allowing the login attempt of the second user to access, via the second computing device, an account associated with the first user, based on: i) the first comparison result or ii) the first comparison result and the second comparison result, rejecting the second user as the first user and denying the login attempt of the second user to access, via the second computing device, the account associated with the first user, based on: i) the first comparison result or ii) the first comparison result and the second comparison result.

In some embodiments, the present disclosure also provides exemplary technically improved computer-based systems, and computer-readable media, including computer-readable media implemented with and/or involving one or more software applications, whether resident on personal transacting devices, computer devices or platforms, provided for download via a server and/or executed in connection with at least one network and/or connection, that include or involve features, functionality, computing components and/or steps consistent with those set forth herein.

BRIEF DESCRIPTION OF THE DRAWINGS

Various embodiments of the present disclosure can be further explained with reference to the attached drawings, where like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 4 is a flowchart illustrating an exemplary process related to user authentication (e.g., video password based user authentication), consistent with exemplary aspects of certain embodiments of the present disclosure.

DETAILED DESCRIPTION

Figure 1:
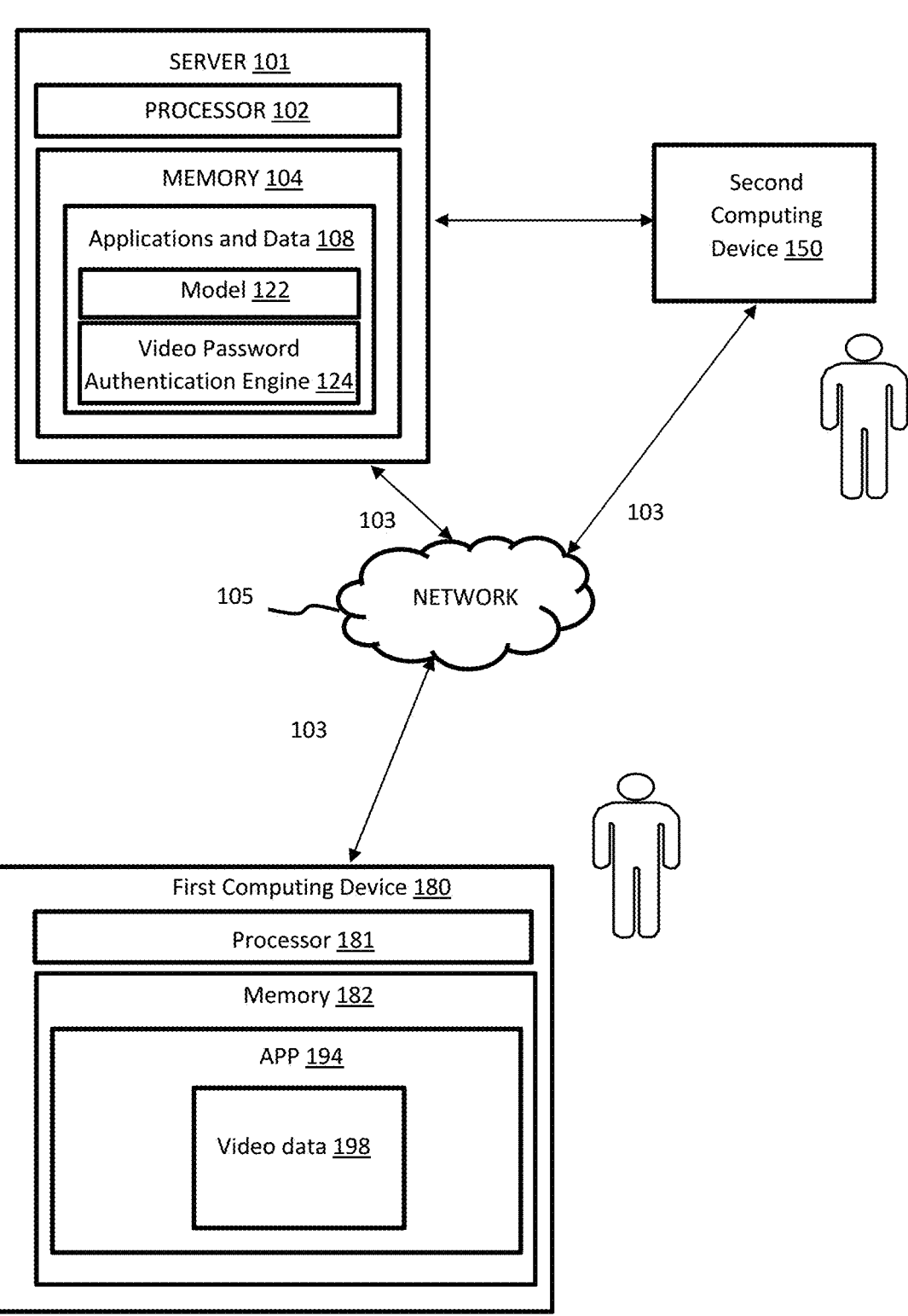
FIG. 1 is a block diagram of an exemplary system and/or platform illustrating aspects associated with user authentication (e.g., video password based user authentication), consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

To benefit from the ease to record user motions as videos and the richness of the information captured in videos that naturally lend itself to embedding strong passwords (e.g., non-static yet complex motion information) with inherent security features (e.g., non-static non-motion information) in motion data and non-motion data, and at the same time to leverage advanced data processing capabilities, various embodiments of the present disclosure provide for improved computer-based platforms or systems, improved computing components and devices configured for one or more practical technological improvements involving: registering video passwords as user-specific authentication criteria; authenticate user identities by comparing video passwords submitted with login or access attempts with the registered (baseline) user-specific authentication criteria, as well as generating intelligence (e.g., machine learning models, etc.) empowered by the various video password based authentication events that are both successful and failed, and/or profile information and user contextual information to, for example, automatically and dynamically identify suitable variations allowed/mandated, or unsuitable variations disallowed in both motion data and non-motion data associated with video passwords to authenticate users with enhanced security, accuracy, efficiency, relevancy, and accessibility, without any tradeoff overwhelming the users.

As used herein, in some embodiments, the term "video password" refers to a video data-based credential that may be utilized in connection with an authentication scheme that verifies the identities of users for the purpose of, for example, allowing the users access to network and/or local resource(s). Video data may be generated by any video capture device having one or more image sensors capable of optically viewing an entity (e.g., a human, a human's body part, an object, a background, etc.) and converting an interpretation of the entity into electronic visual data that includes a multitude of image frames sequentially captured over a period of time. By ways of non-limiting examples, a video capture device may be a standalone video camera (e.g., a security camera, a handheld camera, etc.), a camera as a component of a computing device (e.g., a built-in camera of a mobile phone, a wearable device, or a laptop computer of a user, etc.), a digital camera configured in communication with a computing device (e.g., a webcam connected to a desktop computer, etc.), and the like.

A video capture device may capture and store videos of video data into any suitable format. For example, videos may be packaged in various containers such as AVI, MP4, or MOV, and encoded using various video codec such as Flash, Video (FLV), WebM, Windows Media Video (WMV), Ogg Video (OGV), QuickTime (MOV), MPEG-2, MPG-4, RealMedia (RM), H.263, H.264, and the like. In one example, a video may be captured as a three-dimensional (3D) video in the format of Side-by-Side (SBS), Top-and-Bottom (TAB), Frame Sequential, Anaglyph, Interlaced, and so on. In some embodiments, in addition to visual content, video data may further be associated with a variety of metadata such as a title, a description, information about an author, a file size, a date of creation, a timestamp of creation, location information, information about a capturing device, tags, and so on. Such metadata may be included in video data, a video container, or the like. In some embodiments, video data may include both motion data and non-motion data.

As used herein, in some embodiments, the term "motion data" refers to visual content data of a video that relates to capturing and representing one or more motions performed by a user therein. For example, when a video records a user moving an object with his or her hand against a background scene, the motion data may include the video data that tracks, or otherwise represents the movement made by the user in the video. In some embodiments, the motion data may be processed into a set of motion data points that belong to the motioning body part or body of the user, each data point including information characterize the motion in terms of, for example, magnitude, direction, and/or a time-point (temporal information). For motion data captured in a 3D video, such data point may also include depth information.

As used herein, in some embodiments, the term "non-motion data" refers to visual content data of a video that does not relate to capturing or representing one or more motions performed by a user therein. Using the example described above, the non-motion data may include the visual information about the object, the visual information about the user (e.g., the clothing, personal accessories, etc.), the visual information about the background scene (e.g., wall decorations, viewable part of a rug, a plant, a pet, etc.).

Various embodiments disclosed herein may be implemented in connection with one or more entities that provide, maintain, manage, and/or otherwise offer any services relating to user identity verification or authentication system(s).

In some embodiments, the exemplary entity may be a financial service entity that provides, maintains, manages, and/or otherwise offers financial services. Such financial service entity may be a bank, credit card issuer, or any other type of financial service entity that generates, provides, manages, and/or maintains financial service accounts that entail providing a transaction card to one or more customers, the transaction card configured for use at a transacting terminal to access an associated financial service account. In some embodiments, financial service accounts may include, for example, credit card accounts, bank accounts such as checking and/or savings accounts, reward or loyalty program accounts, debit account, and/or any other type of financial service account known to those skilled in the art.

FIG. 1 depicts an exemplary computer-based system 100 illustrating aspects of technologically improved user authentication (e.g., video password based user authentication) via utilization of at least one machine learning technique, in accordance with one or more embodiments of the present disclosure. An exemplary system 100 may include at least one server 101, and at least one first computing device 180 associated with a first user, which may communicate 103 over at least one communication network 105. In some embodiments and in optional combination with one or more embodiments described herein, the system 100 may further include and/or be operatively connected and/or be in electronic communication with a second computing device 150 of a second user, from which the first computing device 180 may receive a video password provided by the second user during a process of, for example, the first user registers the video password on behalf of the second user, and/or logs into an account on behalf of the second user, in connection with accessing a particular network resource (e.g., server/application/device/service), and the like. In various embodiments, the first user may input login credentials such as a pair of username and password (e.g., a pair of username and password associated with the first user, or such a pair associated with the second user, etc.), each time the user authentication is performed.

Although embodiments herein use examples involving account logins to illustrate the improved features and functionality associated with the improved user identity authentication or verification, it should be understood that any other information and data can be authorized or verified using various embodiments of the disclosure with improved security, privacy, and accuracy. For instance, the improved user identity authorization may be operative on a mobile computing device of a user which has a locking mechanism that, for example, locks its display interface after a configurable timeout or upon a command from the user. In this scenario, the improved user identity authentication of the present disclosure may operate to un-lock the display interface and thus allow the user access to the mobile computing device (instead of a networked resource).

In some embodiments, server 101 may include computers, servers, mainframe computers, desktop computers, etc. configured to execute instructions to perform server and/or client-based operations that are consistent with one or more aspects of the present disclosure. In some embodiments, server 101 may include a single server, a cluster of servers, or one or more servers located in local and/or remote locations. In some embodiments, server 101 may be stand-alone, or it may be part of a subsystem, which may, in turn, be part of a larger computer system. In some embodiments, server 101 may be associated with an entity such as a financial institution (such as a credit card company that services an account of the user, and thereby having the need to verify or authenticate the user in association with various aspects of providing the account services. For instance, the credit card company may host various network resources (e.g., web servers hosting banking services and credit card services, databases, emails, web portals, etc.) that may require the user to authenticate himself or herself in order to access. Typically, the user authentication may include a process to verify the user credentials (e.g., usernames and passwords) entered by the user against the registered user credentials such as those established via an enrollment and/or a setup process. In one example, the server 101 may host an authentication server in connection with hosting the network resources protectively provided to the user. In another example, the server 101 may host an authentication server in connection with the network resources provided to the user outsourced to be hosted by a third-party provider.

Still referring to FIG. 1, server 101 may include at least one processor 102, and a non-transient memory 104, such as random-access memory (RAM). In some embodiments, memory 104 may store application(s) and data 108. Various embodiments herein may be configured such that the application(s) and data 108, when executed by the processor 102, may utilize one or more machine learning techniques to provide all or portions of the features and/or functionality associated with video password based user authentication, in conjunction with or independent of aspects of video password based user authentication implemented at the first computing device 180 and/or the second computing devices 150.

In some embodiments, the features and functionality may include operations such as: obtaining training data (e.g., a first set of training video passwords registered or otherwise established by a first plurality of users (e.g., baseline videos including both baseline motion data and baseline non-motion data, etc.), a second set of training video passwords (e.g., videos including both motion data and non-motion data, etc.) determined as not matching the video passwords registered by respective users of the first plurality of users, a third set of training passwords (e.g., videos including both motion data and non-motion data, etc.) determined as matching the video passwords registered by respective user of the first plurality of users, and/or the profile information and/or contextual information associated with the first plurality of users); training a video password authentication machine learning model with the training data; obtaining a trained video password authentication machine learning model that determines 1) when current motion data of current video password matches baseline motion data, and 2) when current non-motion data of the current video password associated with the current motion data differs from non-motion data associated with the baseline motion data based on at least one authentication criterion; establishing user-specific authentication criterion based on a user's request to register a video password, and/or authenticating the user based on a video password provided in connection with a login attempt. In some embodiments and not shown herein, the features and functionality of the server 101 may be partially or fully implemented at the first computing device 180 (or the second computing device 150) such that the illustrative video password based authentication process may be performed partially or entirely on the first computing device 180 (or the second computing device 150).

In some embodiments, the application(s) and data 108 may include an exemplary video password authentication machine learning model 122. In some embodiments, the video password authentication machine learning model 122 may be trained at the server 101. In other embodiments, the video password authentication machine learning model 122 may be trained by another entity with the training data provided by another entity, and/or with the training data provided by server 101. In some embodiments, the video password authentication machine learning model 122 may also be trained and re-trained at the first computing device 180 associated with the first user. In the latter case, the video password authentication machine learning model 122 may be trained and/or re-trained with training data specific to the first user at the first computing device 180. In this sense, the video password authentication machine learning model 122 itself may be user-specific, residing on the server 101 and/or the first computing device 180.

Various machine learning techniques may be applied to train and re-train the video password authentication machine learning model 122 with training data and feedback data, respectively. In various implementations, such a machine learning process may be supervised, unsupervised, or a combination thereof. In some embodiments, such a machine learning model may include a statistical model, a mathematical model, a Bayesian dependency model, a naive Bayesian classifier, a Support Vector Machine (SVMs), a neural network (NN), and/or a Hidden Markov Model.

In some embodiments, the video password authentication machine learning model 122 may be trained to recognize entity(ies), object(s), background scene(s) recorded in the training data and/or feedback data. For example, the video password authentication machine learning model 122 may be trained to recognize the user(s) depicted in the training data and/or feedback data (e.g., perform facial recognition for the user(s)). For another example, the video password authentication machine learning model 122 may be trained to track an object depicted across frames of a video such that to detect continuity in recording despite the changes in the object's positions relative to a recording camera. For yet another example, upon registration a video password, the user may provide the server 101 with information regarding what is required (or expected of) in the content of the video password, and/or examples of the required content with or without supplying the specific content. In one example, the user may indicate a playback time period (e.g., the starting and ending timestamps corresponding to a segment of a video) to specify what is the required content in the video password. In another example the user may indicate via an input (e.g., a textual input, a voice input, etc.) to specify, for example, "dog wagging tail" as the required content in the video password. In the latter case, various training data (e.g., videos stored in a video library) may be used to provide samples to train the video password and/or the video password authentication machine learning model 122.

In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of neural network may be executed as follows:

a. Define Neural Network architecture/model,
   b. Transfer the input data to the exemplary neural network model,
   c. Train the exemplary model incrementally,
   d. determine the accuracy for a specific number of timesteps,
   e. apply the exemplary trained model to process the newly-received input data, f. optionally and in parallel, continue to train the exemplary trained model with a predetermined periodicity.

In some embodiments and, optionally, in combination of any embodiment described above or below, the exemplary video password authentication machine learning model 122 may be in the form of a neural network, having at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the application(s) and data 108 may include a video password authentication engine 124 that may be programmed to execute the exemplary video password authentication machine learning model 122. In some embodiments, the video password authentication engine 124 may receive, as input, a video password transmitted from the first computing device 180 to the server 101 in association with an attempt to login an account of the first user hosted by the server 101, and utilize the video password authentication machine learning model 122 to determine whether or not the user can be successfully authorized or verified as the first user based on the video password associated with the login attempt and a registered (baseline) video password. For example, when the video password authentication engine 124 succeeds in authenticating the user based on the video password submitted with the login attempt, the server 101 may accept the user as the first user and consequently allow the login attempt to access the account associated with the first user. On the other hand, when the video password authentication engine 124 fails in authenticating the user based on the video password submitted with the login attempt, the server 101 may reject the user as the first user and consequently deny the login attempt to access the account associated with the first user. More details of the video password authentication machine learning model 122 and the video password authentication engine 124 are described with reference to FIGS. 2 and 4, below.

Still referring to FIG. 1, an illustrative first computing device 180 associated with a first user may comprise: one or more processors 181 and a non-transient computer memory 182. Memory 182 may store instructions that, when executed by the one or more processors 181, perform various procedures, operations, or processes consistent with disclosed embodiments. In one embodiment, the memory 182 may include an application (APP) 194 that, when executed by the one or more processors 181, may perform operations such as: prompting the first user for entering a video password for the purposes of registering the video password and/or providing (or modifying) video data 198 as part of a login attempt to access an account of a user; receiving, storing, and/or processing video data 198 for submission to register the video password and/or as part of a login attempt; obtaining video password data communicated to the first computing device via various communication portals (e.g., a video sent by the second user via the second computing device 150 in association with, for example, an SMS message, an MMS message, an email, a chat message, an airdrop data item, etc.); and training and re-training the video password authentication machine learning model 122. In various embodiments, the application 194 may be implemented in any suitable manner such as, without limitation, a standalone application, a browser extension, and the like. Various features and functionality of the application 194 may be implemented as part of other applications, and/or implemented in multiple applications to include more than, less than the features and functionality described above, and/or with combination with any other features and functionality.

In some embodiments, the first computing device 180 may be configured with a video capturing device (not shown) as described above to record raw videos. For example, the first computing device 180 may include a smartphone having a built-in video camera. In some scenarios, the application 194 may be configured with access to the video capturing device such that video data captured thereby may be utilized as video data for authenticating the identity of the user.

In some embodiments, the application 194 may be configured to disallow the first user (or any other users at the first computing device) to alter or modify the video captured therewith. That is, regardless of whether the application 194 (and/or other software programs or firmware/hardware routines executing on the first computing device 180) may be configured to pre-process the captured raw videos, the captured videos may be presented to the first user for actions such as previewing, but not for modifications, etc., during either the process of registering a video password and/or providing a video password as part of a login attempt.

In some embodiments, the application 194 may be configured to prompt the first user with instruction(s) (e.g., cue(s)) provided to the first user with regard to performing movement(s) required during a video password registration process, and/or a login attempt using a video password). For example, the application 194 may display visual cues (e.g., a series of arrows pointing to respective directions for respective periods of time), or textual commands (e.g., a text dialog displaying "draw a FIG. 8 with your right hand," "draw a circle with your left arm with an object in the left hand," "close a door"), or some combinations thereof. Various embodiments herein may be configured such that the instructions can be provided to the first user in any suitable manner. By ways of non-limiting examples, the instruction(s) may be transmitted to the first computing device 180 via the application 194, an email, an SMS message, an MMS message, a social media message, and so on. The instruction(s) may be displayed by a prompting computing device other than the first computing device 180, and/or in any suitable format such as, visual instructions/cues, audio instructions/cues, tactile instructions/cues, not limited by the examples illustrated herein. More details with regard to an exemplary user interface of the application 194 are described with reference to FIGS. 3A-3C, below.

In some embodiments, for the purpose of simplicity, features and functionality associated with the exemplary video password authentication machine learning model 122 (e.g., training, re-training, etc.) are illustrated as implemented by components of server 101. It should be noted that one more of those video password authentication machine learning model-related aspects and/or features may be implemented at or in conjunction with a computing device of a user (e.g., the first computing device 180, or the second computing device 150, etc.). For example, in some embodiments, the video password authentication machine learning model 122 may be partially trained at the server 101 with other users' registered video passwords, login video passwords and their respective authentication results determined based thereon, and in turn transmitted to the first computing device 180 to be fully trained with the user specific video passwords and authentication results based on these video passwords. In another example, the converse may be performed such that the machine learning model 122 may be initially trained at the first computing device 180 and subsequently transmitted to the server 101 for application and/or further training with training data from other users.

Although not illustrated in FIG. 1, in some embodiments, an illustrative second computing device 150 associated with a second user may comprise: one or more processors and a non-transient computer memory. Memory may store instructions that, when executed by the one or more processor, perform various procedures, operations, or processes consistent with disclosed embodiments. In some embodiments, the second computing device 150 may be similar to the first computing device except that it is associated with a different user (e.g., the second user). In some embodiments, the second computing device 150 may be a relatively less technological advanced computing device (e.g., a basic non-smartphone) capable of capturing videos. In some embodiments, the memory may include an application (not shown) that, when executed by the one or more processors, may perform operations similar to the application 194 above illustrated with reference to the first computing device 180.

In one example, the second user may utilize the application to register a video password with the server 101 to establish a user-specific authentication criterion in association with, for example, an account of the second user. Afterwards, the second user may perform a login attempt using a video password that is newly captured by the second computing device 150. In other scenarios, the second user may utilize the second computing device 150 to generate a new video password and send the new video password to another user (e.g., the first user), which in turn may utilize the new video password received from the second user to perform a login attempt on behalf of the second user via, for example, the application 194 executing on the first computing device 180. In this example, in some implementations, such video password may be communicated to the first user in any suitable form such as, an SMS message, an MMS message, an email, a chat message, a social media message, an airdrop data item, a recorded Facetime video, and so on. In other embodiments, the video password may also be communicated to the first computing device 180 via the application (and/or received by the application 194). In some embodiments, the video data related to the video password in the communication may not be modified by either the second user or the first user.

Here, in these examples where a video password is communicated between the first and second users, the video password may be communicated from the second user to the first user as a normal SMS message so that, for example, a man-in-the-middle attacker would not be able to detect which particular video or video-embedding message is the target since a multitude of video clips tend to be communicated between users. In some embodiments, the video password received at the second computing device 180 may be pre-processed at the second computing device 150 prior to be submitted as part of a login attempt or a registration request performed by the first user on behalf of the second user. In other embodiments, such pre-processing may be partially or entirely performed at the server 101, not limited by the examples herein.

Various embodiments herein may be configured such that a user (e.g., the first user or the second user) may register a video password as an authentication criterion in association with accessing an account of the user via any computing device available to the user, as well as perform a login attempt using a video password via any computing device available the user. In some embodiments, the user may utilize the same computing device to register the video password as the authentication criterion as well as to perform login attempts with video passwords. In one example, the first user may utilize the first computing device 180 to register his/her video password with the server 101, as well as to perform login attempts with video passwords. In other embodiments, the user may register a video password with the server 101 via a different computing device than the one utilized to perform subsequent login attempts using video passwords. In one example, the user may register the video password at a browser application executing at a laptop of the user; while login with video passwords via an application executing at a mobile phone of the user.

While only one server 101, second computing device 150, network 105, and first computing device 180 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments. For instance, in some embodiments, the feature and functionality of the server 101 may be partially, or fully implemented at the first computing device 180, and/or the second computing device 150.

Figure 2:
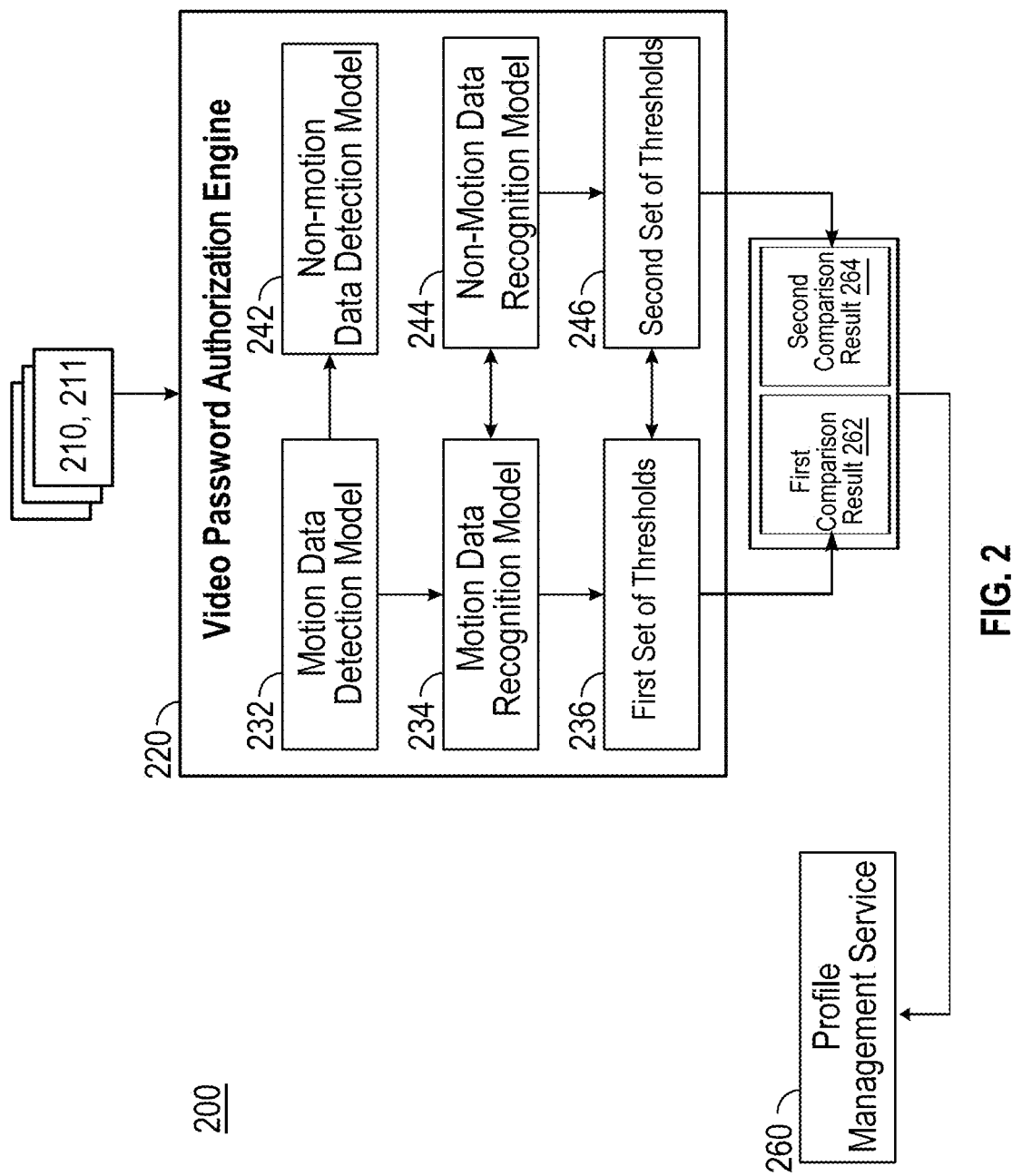
FIG. 2 is a diagram illustrating an exemplary process involving aspects associated with user authentication (e.g., video password based user authentication), consistent with exemplary aspects of certain embodiments of the present disclosure.

FIG. 2 is a diagram illustrating an exemplary video password authentication engine using one or more machine learning techniques, consistent with exemplary aspects of certain embodiments of the present disclosure. In this illustrated embodiment, the exemplary video password authentication engine 220 may be utilized by an authentication system 200 (e.g., an authentication system hosted at the server 101, etc.) to verify a user's identity using a video password submitted in connection with a login attempt. Additionally or separately, in some embodiments, the exemplary video password authentication engine 220 may be utilized by the authentication system 200 to establish user-specific authentication criteria based on video passwords submitted in a registration process.

In some embodiments, the video password authentication engine 220 may register video passwords in association with user profiles to establish various respective user authentication criteria. In some embodiments, in response to a user operation (e.g., via a user computing device such as a smartphone, tablet, laptop computer, desktop computer, smart watch, or other devices in communication with the authorization system 200), the video password authentication engine 220 may initiate a video password registration process for use in authorizing access to the protected resource(s) guarded by the authentication system 200.

In some embodiments, to control access via a user profile, the user may choose to set a video password for the user profile. To do so, in some embodiments, the user may provide a set of credentials to the video password authentication engine 220. The credentials may include, e.g., a user identity (e.g., login name, email address, legal name, phone number, social media account name, etc.) and video data for the video password registration. In some embodiments, the video password authentication engine 220 may utilize the user identity to reference the associated user profile in a profile management service 260 and initiate the registration process for the user profile to modify the user profile via a video password registration. In some embodiments, in response to the user's operation to update the video password stored in the user profile, the video password authentication engine 220 may similarly utilize the user identity to reference the associated user profile in the profile management service 260 and modify the user profile with a new video password registered.

In various embodiments, video data (e.g., video password data) may include any suitable data that represents the user-specific authentication information included in, detected, derived, or otherwise obtained from the video captured by or available at a user's computing device. For example, video data may include raw video(s) captured by or available at the first computing device 180, or available at the video capturing device (e.g., the first computing device 180 may receive a video from the second computing device 150 and send the video on behalf of the second user as the video data to the server 101). In some embodiments, at the authentication system 200, the video data may be processed into visual input data 210 that includes, for example, a set of motion data and/or a set of non-motion data. As shown in the illustrative embodiment of FIG. 2, the visual input data 210 may be in turn provided to the video password authentication engine 220 for registering/updating the visual input data as the user-specific authentication criterion in the user profile during a registration/video password updating process, and/or verifying the visual input data against the stored user-specific authentication criterion during a login process.

In some embodiments, raw videos captured by or available at the computing device of the user may be fully processed into visual input data 210 at the computing device for transmission to the authentication system 200. Here, raw videos may similarly be processed into visual input data 210 that includes a set of motion and/or a set of non-motion data. In other embodiments, raw videos may be partially processed at the computing device for transmission to the authentication system 200, which may perform further processing to generate the visual input data 210 that can be provided to the video password authentication engine 220. For example, the video data may be processed at the computing device by, for example, the application 194, to generate a set of motion data that extracts and captures the movement depicted in the video data. In some implementations, the application 194 may rely on motion analysis software programs to extract the motion data points. By ways of non-limiting examples, such motion analysis software programs may include Kinovea, V1 Home, PhysMo, Tracker, Motion Analysis Tools, WINanalyze, and so on.

Further, the video data may be processed by the application 194 such that the non-motion content of the video data is captured and represented in various suitable formats. In some embodiments, the non-motion data may be extracted and stored in a format or data structure such that the video data may be transmitted at a reduced file size. In one example, the non-motion data may include one or more image frames of the video capturing the object(s) and background scene in the video. For another example, the non-motion content of the video data may be processed into a grey style video, one or more grey style image frames, a black and white video, and one or more black and white image frames. In other examples, non-motion data may also be processed into one or more objects representations for the object that the user moves, the object depicted in the background, one or more background scene representations, and the like. By varying where videos can be processed into visual input data 210, network bandwidth constraint may be addressed when communicating relatively large sized data, and thereby enhancing authentication efficiency and responsiveness.

In some embodiments, the video data may be processed, either at the computing device of the user, the authentication system 200, or in a combination thereof, such that the visual input data 210 includes all or part of the metadata associated with the video data. Such metadata included in the visual input data 210 may be utilized by the video password authentication engine 220 in connection with comparing the motion data and/or the non-motion data for the purpose of authenticating the user, the details of which are described below.

Still referring to FIG. 2, the video input data 210 may include raw videos captured by the video capturing device. In other embodiments, the visual input data 210 may include video data that has been processed partially at the computing device of the user (e.g., the first computing device 180, the second computing device 150, etc.), and/or partially at the authentication system 200 (e.g., the server 101). In other embodiments, the visual input data 210 may also include video data that is entirely pre-processed either at the computing device of the user or the authentication system 200.

In some embodiments, the video password authentication engine 220 may utilize a motion data detection model 232 to detect, and extract motion data from the visual input data 210. For example, the motion detection model 232 may adopt various motion analysis techniques that may track the movement of the user over time by detecting a set of motion data points in image frames of a video, the data points belonging to the same object (e.g., the user's hand, an object held by the user's hand) that is moving in the video. Information such as magnitude, velocity, and direction of the motions in the image frames may be captured into a set of motion data points. In some embodiments, the set of motion data points may be produced as a set of time-dependent data. Details about the motion analysis software programs are similar to those described above, and not repeated herein.

Still referring to the aspect where the video password authentication engine 220 being configured to use the visual input data 210 to establish a user-specific authentication criterion for the user profile, in some embodiments, the video password authentication engine 220 may store the visual input data 210 itself as the user-specific authentication criterion or part of the user-specific authentication criterion. In some embodiments, the video password authentication engine 220 may store the set of motion data and the set of non-motion data of the visual input data 210 as the user-specific authentication criterion or part of the user-specific authentication criterion.

In some embodiments, the video password authentication engine 220 may utilize a non-motion data detection model 242 to process the non-motion data of the visual input data

210 into a collection of representations of physical objects set against a particular background scene. The physical objects may include one or more portable objects (e.g., a coffee mug, a pet, a moveable piece of furniture, a piece of accessory worn by the user, a piece of clothing worn by the user, etc.), and/or relatively stationary objects (e.g., a piece of furniture, a plant, an appliance, etc.), each in one or more positions with respect to the background scene.

In some embodiments, the physical objects may be set against a background scene. For example, the user may perform the movement in the video with the physical objects against the background scene of the user's particular office space, a particular wall of a room, a particular window, or any other background scene. In some embodiments, the background scene may include any physical objects, stationary objects, colors, patterns, shapes, textures, etc. that may appear in the background scene (e.g., a landscape visible through a window, a poster or picture on a wall, a rug on a floor, a throw on a sofa in a space, a plant in the room or office space, an appliance in the room, a piece of furniture in the space, an architectural design of the space, etc.).

In some embodiments, the non-motion data, whether stored in still image(s), video frame(s), or a combination thereof, may be ingested by the object detection model 242 of the object password engine 220. In some embodiments, the object detection model 242 may analyze the non-motion data to detect the physical objects, the background scene, and/or the user among any other objects represented in the visual input data 210. Various machine learning techniques may be utilized by the object detection model 242 to automatically detect, recognize, and label physical objects, backgrounds, scenes, structures, faces, full bodies, body parts (e.g., heads, arms and/or hands and/or fingers), among other objects captured in the non-motion data of the visual input data 210. For instance, the non-motion data detection model 242 may implement a non-neural network based approach based on a feature detection model and a classifier model. In this case, the feature detection model may process the non-motion data to form features based on variations in color, contrast, luminance, or other image data. Various techniques such as a Viola-Jones algorithm, scale-invariant feature transform (SIFT), histogram or oriented gradients (HOG), or other key-point based and gradient based feature detection techniques may be employed or any combination thereof. In some embodiments, upon feature detection, the object detection model 242 may employ the classifier model trained to recognize combinations of features and feature positioning/orientation to classifier objects made of up of sets of features. For example, the classifier model may include, e.g., a support vector machine, decisions trees, random forests, learning vector quantization, Naïve Bayes classifier, or other suitable classification algorithm based on the detected features.

In some embodiments, the non-motion data detection model 242 may employ a neural network based approach to object detection. In such an approach, the non-motion data detection model 242 may use a neural network, such as a suitable convolutional neural network architecture of object detection and/or recognition, to ingest the non-motion data and output object labels for each object identified. In some embodiments, the labels may include, e.g., a descriptor identifying the object, such as, e.g., a cup, a plant, a hand, a pet, etc. However, in some embodiments, the neural network may simply label each detected object according to a unique identifier, such as, e.g., object 1, object 2, etc. In various examples, the neural networks may include any suitable neural network architecture as described above with reference to FIG. 1. In some embodiments, the neural network may be trained to detect objects based on supervised, semi-supervised, or un-supervised training using a training dataset of annotated non-motion data (e.g., annotated image frames).

As a result, the non-motion data detection model 242 may output object representations for the detected physical objects presented by the non-motion data, a background representation or the detected background scene, and/or a user representation for the detected user. In some embodiments, the object representations may include any object representation in each image recognized by the non-motion data detection model 242 in the visual input data 210, or according to any other suitable criteria.

In some embodiments, the non-motion data detection model 242 may also output a position of each detected object of the non-motion data, including the position of each of the object representations, the background representation, and the user representation captured in the non-motion data. In various embodiments, the non-motion data detection model 242 may utilize any suitable techniques to identify a position of each physical object relative to other physical objects, and/or the particular background scene. In this case, the collection of physical objects set against a background scene may further include such positional information capturing the spatial relativeness amongst physical objects, and between physical objects and the background scene. Accordingly, the video password authentication engine 220 may register the collection of representations of the physical objects, the background scene, and the spatial relativeness as part of the authentication criterion for the user profile.

In some embodiments, to improve accuracy and reliability for detection of the motion data and/or the non-motion data, the user may be instructed to resubmit one or more videos recording the user performing the same movement. This way, the video password authentication engine 220 may capture the motion data based on multiple sets of similar motion data and the non-motion data based on multiple views of the same physical objects, and/or the particular background scene. For example, the video password authentication engine 220 may store an averaged motion data points representing the user's signature motion when performing the movement. For another example, the video password authentication engine 220 may store a set of non-motion data in association with object representations that represents physical objects from any side, angle, surface, or other view of each physical object, and a set of non-motion data in association with background representations that represents the background scene from any viewing angle, lighting condition, and so on.

In some embodiments, the authentication system 200 may designate a component other than the video password authentication engine 220 to register video passwords for users such that the video password authentication engine 220 may be responsible for authenticating users based on the authentication criterion registered. In other embodiments, the authentication system 200 may outsource the establishment of authentication criteria using video passwords to a third-party entity such that the video password authentication engine 220 may communicate with the third-party entity to access registered authentication criteria of users during the authentication process. Further, in some embodiments, the functionality of various components of the video password authentication engine 220 may be implemented at other third-party entity(ies). For instance, the features with regard to detecting and generating a motion data model, detecting and identifying various physical objects set against a background scene into non-motion data model may be implemented at third-party entity(ies) as well. In this scenario, the authentication system 200 may be dedicated to performing comparisons between the established authentication criterion and new video password provided in login attempts.

In some embodiments, the motion representation (e.g., a set of motion data points), the object representations, and the background representation may be registered with the profile management service 260. In some embodiments, the profile management service 260 may include a user profile associated with the user for the video password. In some embodiments, the profile management service 260 may control access to the user profile, e.g., for operations relative to the user profile, using a set of permissions. In some embodiments, to authorize operations for the user profile, a request (e.g., a login attempt) may include a video password as credentials to trigger one or more permissions from the set of permissions. Thus, in some embodiments, the video password authentication engine 220 may provide the motion representation, the object representations, and the background representation to the profile management service 260 for registration as the video password such that the video password submitted with the request may be compared according to each factor for authorization.

Still referring to FIG. 2, in some embodiment, the video password authentication engine 220 may be utilized to authenticate the user based on the registered video password and new video passwords submitted in attempts to login subsequently to the above-described registration. In this illustrated example, visual input data 211 is used to illustrate the authentication process. In some embodiments, the visual input data 211 may be received as part of a login attempt communicated from the computing device of the user to the authentication system 200. The visual input data 211 may be similar to the visual input data 210 described above (e.g., the visual input data 211 may be fully, partially, or not preprocessed at the computing device of the user prior to being transmitted to the authentication system 200), details of which are not repeated herein. Similar to the above-described registration process that establishes authentication criteria using video passwords, functionality involving any processing of the visual input data 211 may be implemented fully or partially at the computing device of the user, the authentication system 200, and/or other third-party entities in connection with the authentication system 200, not limited by the embodiments herein.

In this illustrative embodiment, the visual input data 211 may be ingested by the video password authentication engine 220. In some embodiments, the motion data detection model 232 may be utilized to analyze the visual input data 211 to, for example, detect and extract motion data included therein. In some embodiments, the non-motion data detection model 242 may be utilized to analyze the visual input data 211 to, for example, detect and extract non-motion data included therein. Details are similar to those described with reference to the registration process illustrated above using the video password authentication engine 220, and therefore not repeated herein. As a result, the motion data detection model 232 may identify the motion data included in the visual input data 211 into motion data representation; while the non-motion data detection model 242 may identify the non-motion data included in the visual input data 211 into non-motion data representation including, for example, object representation(s) and/or background scene representation(s).

As illustrated herein, and in some embodiments, the detected motion data representation(s) may be provided to a motion data recognition model 234. Additionally or separately, also as shown herein and in some embodiments, the detected non-motion data representation(s) may be provided to a non-motion data recognition model 244. Various embodiments herein may be configured such that the motion data recognition model 234 compares the detected motion data representation(s) to the motion data representation(s) registered with the profile management service 260; while the non-motion data recognition model 244 compares the detected non-motion data representation(s) to the non-motion data representation(s) registered with the profile management service 260.

In some embodiments, the profile management service 260 may provide the video password registered as the user-specific authentication criterion stored in the user profile. As described above, the video password may include, for example, the motion data representation(s), and the non-motion data representation(s) including the object representation(s) and the background scene representation(s). Accordingly, the motion data recognition model 234 and the non-motion data recognition model 244 may utilize any suitable techniques to perform the respective comparisons. For example, to compare motion data, the motion data recognition model 234 may implement similarity measures based on differences in global transformations, motion content, motion style, logical similarity, partial similarity, and/or numerical similarity. Various features associated with human motions may be used to perform those similarity measures. In some implementations, human motion features may be categorized into anthropometric features (e.g., body height and width, lengths of particular body parts, joint rotation limits, etc.), pose features (e.g., joint angle rotations, distance-based pose features, relational features, silhouette-based features, etc.), transition features (e.g., instantaneous velocity, instantaneous acceleration, kinetic properties, etc.), and action features.

In some embodiments, to compare non-motion data, the non-motion data recognition model 244 may perform similarity measures by comparing features associated with the non-motion data representation(s) such as geometric features, key-points, distances between key-points, locations of objects within an image or frame, locations of objects relative to each other, locations of objects relative to a user, location of objects relative to a background, size of each object, orientation of each object, among other features detected by the non-motion data detection model 244.

As a result, a similarity between detected motion data representation(s) and the registered motion data representation(s), each detected object representation and each object representation, each detected background scene representation(s) and the registered background scene representations(s) may be respectively assessed using, for example, their respective similarity models. For instance, a first similarity measure between the detected motion data representation(s) and the registered baseline motion data representation(s) may be determined via computing, for example, a Euclidean distance, norm of difference of quaternions, deviation from the identity matrix, geodesic on the unit sphere, temporal alignments, dynamic time warping, hidden Markov models, curve representations, and so on.

Similarly, a second similarity measure between the feature vector/map of the detected object representation(s) and the feature vector/map of the registered object representation(s), and/or a third similarity measure between the feature vector/map of the detected background scene representation(s) and the feature vector/map of the registered background scene representation(s) may be determined via computing, for example, an Euclidean distance, cosine similarity, Jaccard distance, Pearson correlation coefficient, or any suitable similarity measure, respectively. In some embodiments, the feature vector/map of the detected object representation(s) and the registered object representation(s), and/or the detected background scene representation(s) and the feature vector/map of the registered background scene representation(s) may include factors such as locations of the users relative to the background, location of the user relative to the objects, size of objects in the background, orientation or angle of the background, geometric and/or key-point features of background, among other object characteristics represented in those representations.

In some embodiments, the similarity measures may be used to determine whether and how the detected motion data representation(s) match(es) the registered motion data representation(s), and whether and how the detected non-motion data representation(s) match(es) the registered non-motion data representation(s). In some embodiments, the similarity measure for the motion data representation(s) may be compared to one or more threshold values stored in a first set of thresholds 236. In some embodiments, the similarity measure for the non-motion data representation(s) may be compared to one or more threshold values stored in a second set of thresholds 246.

Turning to the first set of thresholds 236 first, according to some aspects of the present disclosure, the first set of thresholds 236 may include one or more of: a required similarity threshold value, an allowed dis-similarity threshold value, a required dis-similarity threshold value, and a disallowed similarity threshold value. In some embodiments, the above described threshold values may be specified, instead of in addition to a single value, as a range of threshold values. In some implementations, one or more of those threshold values may be configured by the authentication system 200, the users themselves, learned by a video password authentication machine learning model (e.g., the model 122), or some combinations thereof.

In some embodiments, the similarity measure for the motion data representation(s) may be compared to the required similarity threshold values of the first set of thresholds 236, above which a match between a particular detected motion data representation and corresponding registered motion data representation in the user profile may be determined. In this check, the detected motion data representation and the registered motion data representation have to exhibit a minimal level of similarity in order to be considered as matching.

Additionally or separately, in some embodiments, the similarity measure for the motion data representation(s) may be compared to a disallowed similarity threshold value of a first set of thresholds 236, above which a disallowed match between a particular detected motion data representation and corresponding registered motion data representation in the user profile may be determined. In this check, when the detected motion data representation and the registered motion data representation are determined as too similar to each other, it is likely that the registered video password may be comprised such that, for example, a phishing party may attempt to login with a video password duplicated or otherwise derived from the compromised video password. The rationale behind this check is that it is highly unlikely that a human being can perform the same movement in an exact same manner during different video recordings. For example, when the detected motion data representation(s) is determined as matching the registered motion data representation(s) 100% without any variation, it is highly likely that the newly submitted video password is a copy of the registered video password that has been comprised.

Further, additionally or separately, in some embodiments, the similarity measure for the motion data representation(s) may be converted to a dis-similarity measure and in turn compared to an allowed dis-similarity threshold value of a first set of thresholds 236, above which a disallowed match between a particular detected motion data representation and corresponding registered motion data representation in the user profile may be determined. In this check, similar to the rationale behind the checks described above in connection with the disallowed similarity threshold value, the detected motion data representation has to exhibit an acceptable degree of variation from the registered motion data representation to be considered as matching.

Further, additionally or separately, in some embodiments, the similarity measure for the motion data representation(s) may be converted to a dis-similarity measure and in turn compared to a required dis-similarity threshold value of a first set of thresholds 236, below which a disallowed match between a particular detected motion data representation and corresponding registered motion data representation in the user profile may be determined. In this check, the detected motion data representation and the registered motion data representation have to exhibit a minimal level of dis-similarity in order to be considered as matching.

Thus, by using one or more of the above-described threshold values, the motion data of the video password may be authenticated not only with a required and allowed degree of similarity, but also with a required and allowed degree of dis-similarity.

Turning to the second set of thresholds 246, according to some aspects of the present disclosure, the second set of thresholds 246 may include one or more of: a required dis-similarity threshold value, an allowed similarity threshold value, a required similarity threshold value, and a disallowed dis-similarity threshold value. In some embodiments, the above described threshold values may be specified, instead of in addition to a single value, as a range of threshold values. In some implementations, one or more of those threshold values may be configured by the authentication system 200, the users themselves, learned by a video password authentication machine learning model (e.g., the model 122), or some combinations thereof.

In some embodiments, the similarity measure for (each of) the non-motion data representation(s) may be converted to a dis-similarity measure and in turn compared to the required dis-similarity threshold values of the second set of threshold 246, above which a match between a particular detected non-motion data representation and corresponding registered non-motion data representation in the user profile may be determined. In this check, the detected non-motion data representation and the registered non-motion data representation have to exhibit a minimal level of dis-similarity in order to be considered as matching for the purpose of authentication.

Additionally or separately, in some embodiments, the similarity measure for the non-motion data representation(s) may be converted to a dis-similarity measure and in turn compared to a disallowed dis-similarity threshold value of a second set of thresholds 246, above which a disallowed match between a particular detected non-motion data representation and corresponding registered non-motion data representation in the user profile may be determined. In this check, when the detected non-motion data representation and the registered non-motion data representation are determined as too different from each other, it is likely that an attacker may attempt to login with a video password as the attacker cannot reproduce similar non-motion data therein.

Further, additionally or separately, in some embodiments, the similarity measured for the non-motion data representation(s) may be compared to an allowed similarity threshold value of a second set of thresholds 246, below which an allowed match between a particular detected non-motion data representation and corresponding registered non-motion data representation in the user profile may be determined. In this check, the detected non-motion data representation has to exhibit an acceptable degree of similarity with the registered non-motion data representation to be considered as matching for the purpose of authentication.

Further, additionally or separately, in some embodiments, the similarity measured for the non-motion data representation(s) may be compared to a required similarity threshold value of a second set of thresholds 246, below which a disallowed match between a particular detected non-motion data representation and corresponding registered non-motion data representation in the user profile may be determined. In this check, the detected non-motion data representation and the registered non-motion data representation have to exhibit a minimal level of similarity in order to be considered as matching for the purpose of authentication.

Thus, by using one or more of the above-described threshold values, the non-motion data of the video password may be authenticated not only with a required and allowed degree of dis-similarity, but also with a required and allowed degree of similarity.

In some embodiments, the first set of thresholds 236 and second set of thresholds 246 may be configured with an inter-relationship based on, for example, various profile and/or contextual information of the user. For instance, if the first set of thresholds 236 imposes a relatively stringent threshold values (or imposes all of the above-described checks), the second set of thresholds 246 may be configured to impose a relatively less stringent threshold values (or imposes less of the above-described checks). In some embodiments, such inter-relationship may be learned by the video password authentication machine learning model 122 such that the video password authentication engine 220 may dynamically verify user identities to achieve heightened accuracy and security in user authentication. Details are described with reference to FIG. 4, below.

In various embodiments, the first comparison result 262 may be computed based on one or more of the above-described checks on the motion data similarity; while the second comparison result 264 may be computed based on one or more of the above-described checks on the non-motion data dis-similarity. Based on one or both of the first comparison result 262 and the second comparison result 264, the video password authentication engine 220 may determine to accept the login request, reject the login request, or instruct the user to modify and re-submit another video password to login again.

Figures 3A, 3B, 3C:
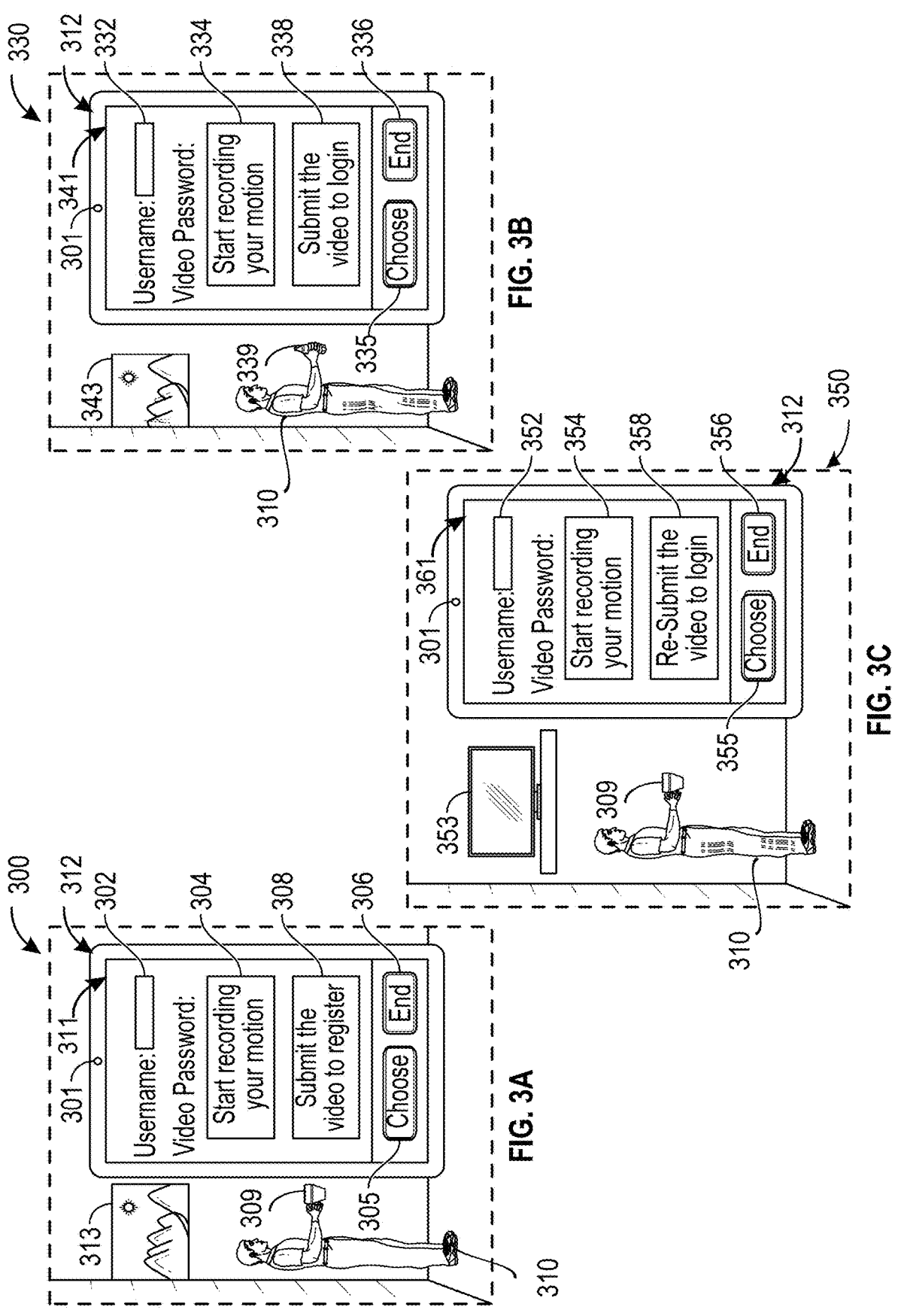
FIGS. 3A-3C are diagrams illustrating exemplary scenarios, in conjunction with exemplary graphical user interfaces (GUIs), involving aspects associated with user authentication (e.g., video password based user authentication), consistent with exemplary aspects of certain embodiments of the present disclosure.

FIGS. 3A-3C are diagrams illustrating exemplary graphical user interfaces (GUIs) involving aspects associated with video password based authentication in exemplary scenarios, consistent with exemplary aspects of certain embodiments of the present disclosure. In some embodiments, the GUIs may be provided by an application (e.g., the application 194 executing on the first computing device 180 of FIG. 1) and shown on a display of a mobile device having a video camera (e.g., the first computing device 180 of FIG. 1). In some embodiments, and as illustrated herein FIGS. 3A-3C, the same application may be operated on the mobile device in connection to both the process where the user performs a movement to register the video password, and the process where the user attempts to login an account via submitting a new video password. In other embodiments, the application allowing the user to perform the registration process to establish a video password may be different from the application allowing the user to login with a new video password. For example, the user may capture a movement in a video clip (e.g., a video clip captured by a webcam of a desktop computer or other video capturing device as described above, etc.) and transmit the video clip to the server as a registered video password at a web portal associated with the server, while request an access to login using a new video captured via the application executing on the mobile device.

FIG. 3A illustrates an exemplary space 300 where a user 310 may utilize a computing device 312 to register a video password with a server (not shown). Here, the user 310 may interact with a GUI 311 of an application (e.g., the application 194) executing on the computing device 312 to capture a video of the user performing a movement, as well as submit the captured video data to the server to complete the registration process such that the server may store a video password based on the submitted video data as a user-specific authentication criterion. As illustrated in this exemplary GUI 311, the user 310 may enter his user identification information (e.g., username) at a text box 302 such that the subsequently provided video may be associated with the entered username in, for example, a user profile as described above. Here, since the computing device 312 is equipped with a video camera 301, the application may allow the user to access the video camera 301 to start to capture a video by selecting a button "Start recording your motion" 304, and conclude the capturing of the video by selecting a button "End" 306. As illustrated herein, the user 310 may record a movement with his right hand holding a coffee cup 309 against a background scene having a wall portrait 313 in the space 300.

Once done with recording the video, the user may select a button "Submit the video to register a video password" button 308 such that the video itself, or video data extracted based thereon may be transmitted to the server for registering a respective video password at the server side. In some embodiments, the video may be pre-processed the computing device 312 to render the raw video into video data that ranges from a fully processed set of motion data and set of non-motion data that may be provided directly to, for example, the profile management service 260 as the user-specific authentication criterion, or any suitable intermediary video data extracted from the raw video or partially processed video data (e.g., a selective set of video frames that characterize the movement performed by the user and the space in which the user performs the movement, a set of motion data and a grey-scaled one image frame depicting the objects and the background scene in the space, or some combinations thereof), not limited by examples illustrated herein though.

In some embodiments, the user 310 may perform the movement according to his own design. That is, the user 310 may configure motions of the movement without following any instructions from, for example, the server. For example, the user may manually download his favorite synchronized dancing video clip from online and follow a portion of the hand movement recorded in the video clip. In other embodiments, the user may be presented with instructions that prompt the user through a series of motions to perform the movement. In some embodiments, the instructions may be provided upon the user 310 clicking on the "Start recording your motion" button 304 at the GUI 311.

Although not shown herein, in one example, the GUI 311 may present to the user a collection of movement templates (e.g., tiles of thumbnails) to choose from. Each tile may display a brief description of the movement to the user via, for example, an animated short series, textual description, audio description, and so on. Such movement templates may include movements performed by a hand in a particular gesture, movements by a hand and with the hand holding an object, movements by an arm, movements by a head, movements by a whole body, and the like. In other embodiments, the movement template may include instructions to, for example, close a door, lift a chair, pet a pet for a designated period of time, and so on, without specifying detailed motions the user may perform to in the movements. In one example, once the user selects a particular movement template, the corresponding instructions may be presented to prompt the user to follow each of the motions of the particular movement template to generate the video. In some implementations, the instructions may include a series of gradually colored indicator arrows that guide the user to perform motions in designed directions (e.g., the directions of the indicator arrows) and for a designed amount of time (e.g., the amount of time it takes for the indicator arrows to become filled up with a color).

Various techniques may be adopted to present the instructions to the user in any suitable manner, not limited by examples illustrated herein. For instance, in some implementations, the instructions may be transmitted to a user's computing device as an email or an SMS message, which are in turn utilized to prompt the user to perform the movements for recording at the application in the form of audio instructions, and so on.

In some embodiments, the application may require the user 310 to repeat the movements performed under the guidance of the instructions, without or without variation(s). In some embodiments, the instructions may require the user to change or modify the background scene against which the previous movements have been performed. For instance, the user 310 may go to another room of his house, change the recording angle in the same room, place an additional object in the background (e.g., add a plant), or move the position of an object depicted in the background (e.g., move a plant), and so on. In some embodiments, the instructions may require the user to change or modify the object (e.g., coffee cup 309) that is also moved by the user in connection to his previous movements. For instance, the user 310 may be prompted to hold a different object (e.g., a water glass) in his hand, wear a piece of personal accessory (e.g., a hat, a brooch, a bracelet, a necklace, a vest, a jacket, etc.), hold a pet, hold a child, and so on. In those scenarios, multiple videos may be utilized to establish one video password for the user. The instructions may also prompt the user to change or modify the background scene by changing the recording shot angle to one or more new angles such that the same background scene may be captured in the video to show different characteristics (e.g., showing a different side view of the coffee cup 309).

At GUI 311, in addition to or instead of recording the video, the user may select a button "Choose" 305 to browser a collection of video files and choose one as the video with which to register a video password. The collection of video files may include video clips recorded by other video capturing device and transmitted to the computing device via various communication channels such as, emails, SMS messages, MMS messages, social media messages, chat application messages, and so on. In one embodiment, another user (e.g., the second user of FIG. 1) may send a video clip to the computing device of the user such that the user may register, on behalf of the other user, the video clip to establish a video password for the other user. In one example, the other user having a computing device (e.g., the second computing device 150, non-smartphones, etc.), not provided with smartphone functionality to run the application (e.g., the application 194) but otherwise equipped with a video camera, may nevertheless rely on the user's more advanced computing device 312 to engage the improved video passwords authentication.

FIG. 3B illustrates an exemplary GUI 341 of the application (e.g., the application 194) for presenting the user with an interface to login with a video password. In some embodiments, the login may be associated with an attempt to access, for example, an account of the user established under the username and the video password stored at the user's profile, which may be a result of the user completing a registration process as described above. Here, as illustrated in FIG. 3B, the GUI 341 may display a text box 332 to the user such that the user may enter the user identification information (e.g., username) as one of the login credentials. The GUI 341 may similarly include a "Start recording your motion" button 334 and an "End" button 336. Here, similar to the registration process described above, the application may allow the user to access the video camera 301 to, for example, select the "Start recording your motion" button 334 to start to utilize the video camera 301 to record a movement performed thereby, and conclude the recording by selecting the "End" button 336, respectively.

As illustrated in this example, the user 310 may record a new video capturing a movement with his right hand holding a bottle of soft drink 339 against a background scene having a wall portrait 343 in a space 330. Here, the space 330 may be in the same space 300 in which the user 310 performs and records the video to register the video password. However, even in the same space, when recording the new video, the user may be located at a position different from the one when he records the video for registration, and therefore the background scene in the same space may be captured in a different viewing angle and/or manner. For instance, as illustrated in FIG. 3B, the wall portrait 343 may be the same wall portrait 313 of the space 300 but captured as a partial image of the wall portrait 313 in the new video.

Once done recording the new video, the user may select a "Submit the video to login" button 338 such that the new video or the new video data derived therefrom may be transmitted to the server as part of a request to login into the account associated with the username. In some embodiments, after the user selects the "Submit the video to login" button 338 to commit to using the video as the video password to login, the application may transmit the raw new video itself to the server to trigger the login process as described above. In other embodiments, the new video may be pre-processed by the computing device 312, details of which are similar to described above with reference to FIG. 2 and are not repeated herein. In some embodiments, the new video may be pre-processed at the computing device 312 to the same extent as how the video submitted for registering the video password has been. For example, if the video for registering the password for the account has been transmitted to the server as a raw video, the new video may be submitted as a raw video as well during the course of the login attempt. In other embodiments, the new video may be pre-processed at the computing device 312 to a different extent than how the video submitted for registering the video password has been. For example, when the user 310 completes recording the new video for submission as part of the login request at the GUI 341, the application may detect that a Wi-Fi network connection might have gone down and it would be resource-expensive to communicate (e.g., taking much longer) the entire content of the raw new video to the server via a cellular communication network. As a result, the application may pre-process the new raw video to a suitable extent and transmit the video data extracted instead of the raw video itself in this particular login process, to the server.

In some embodiments, also similar to the GUI 311 of FIG. 3A, instead of recording the new video, the user may select a button "Choose" 335 to browser a collection of video files and choose one as the new video to submit as part of the login attempt. The collection of video files may be similar to those described with reference to FIG. 3A and details are not repeated herein. In one embodiment, another user (e.g., the second user of FIG. 1) may send a new video clip to the computing device 312 such that the user may login, on behalf of the other user, with the new video received therefrom. In this scenario, the technologically improved video password based authentication may likewise benefit from the fact that it is difficult for a man-in-the-middle attacker to identify which one(s) of out the many videos communicated between the user and the other user is (are) utilized as a login credential, even though the attacker may be able to intercept every video sent from the other user to the user. Further, during the login step, the technologically improved video password based authentication also may likewise afford users operating a less technological advanced computing device (e.g., a basic mobile, non-smart phone that nevertheless has a video camera) with enhanced secure user authentication.

In some embodiments, the user 310 may perform the movement in the new video according to his own design utilized in the registration process. In other embodiments, when the user has utilized a movement template provided by the server to perform and record the movement in the video for registration, the user may again be presented with the instructions that prompt the user through the same series of motions performed in the registration process. In some embodiments, the instructions may be provided upon the user 310 clicking on the "Start recording your motion" button 334 at the GUI 341. Details of the instructions and providing the instructions to the user to prompt the user to perform a movement for capturing in the new video are similar to those described above, and are not repeated herein.

In some embodiments, the application may require the user 310 to perform and record multiple new videos in the login process as well. For instance, the server may compare the video password based on the new video recorded at the GUI 341 with the baseline video password data registered for the user and determine that the user 310 may not be sufficiently authenticated but also not sufficiently identified as non-authenticated. Using the example illustrated in FIG. 3B, the determination might be based on that (e.g., on the high level and without going into the details involving the various models and sets of thresholds of the video password authentication engine 220), on the one hand, the user 310 seems to have performed a borderline matching movement in the new video and the user 310 seems to be in different clothing. On the other hand, the background scene seems to display the same wall portrait and the user seems to hold an object that is not unique to the user 310 (e.g., in this example, the user may not be known to the server as the one who consumes soft drinks at all according to the various profile/contextual data of the user 310). In this simplified example, from the perspective of the video password authentication engine 220, the first comparison result for the motion data may indicate a matching with the registered motion data (e.g., baseline motion data) under the conditions of the first set of thresholds 236, but the non-motion data has not been, for example, affirmatively considered as differing from the baseline non-motion data of the user-specific authentication criterion because, for example, the background scene is not sufficiently different from the background scene in the registered non-motion data, the object held by the user is not sufficiently different from the object held by the user in the registered non-motion data, but the object worn by the user is somehow different from the one worn by the user in the registered non-motion data.

In this case, the server may instruction the application to require the user 310 to generate another new video to submit another login request. Any suitable techniques may be implemented such that the user may be notified of such requirement during the login process initiated at the GUI 341. For instance, a dialog may be presented to the user and instruct the user to, for example, use a coffee cup to perform the same movement, and in turn present, for example another login GUI 361 to the user. Details with regard to examples about how such determination is made and what additional instructions would be provided to the user are described with reference to FIG. 4, below.

FIG. 3C illustrates an exemplary GUI 361 of the application (e.g., the application 194) for presenting the user with an interface to login with an additional video password in connection with the scenario described above. In some embodiments, when the server requires additional video data to facilitate the authenticating of the login request. In some embodiments, the GUI 361 may be similar to the GUI 341 described with reference to FIG. 3B. Here, as illustrated in FIG. 3C, the GUI 361 may display a text box 352 to the user such that the user may enter again the user identification information (e.g., username) as one of the login credentials. The GUI 361 may include a "Start recording your motion" button 354 and an "End" button 356. Here, similar to the previous login process described above, the application may allow the user to access the video camera 301 to, for example, select a "Start recording your motion" button 354 to start to utilize the video camera 301 to record a movement performed thereby, conclude the recording by selecting an "End" button 356, and choose a video by selecting a "Choose" button 355, respectively.

In this example, the user 310 may record a new video capturing a movement with his right hand holding the coffee cup 309 against a background scene having a TV set 353 in a space 350. Here, the space 350 may be different from the space 330 in which the user performs and records the previous movement. In one example, the user 310 may be instructed to go to a different room to record this new video. In another example, the user 310 may decide himself to go to a different room such that the new video would record a different background scene. In this illustrated example, not only the user 310 is holding an object different from the one in the previous movement, also the background scene of this new video depicts an object (e.g., the TV set 353) different from the one (e.g., the wall portrait 343) captured in the previously submitted video.

In some embodiments, upon the user clicking on a "Submit the video password to login" button 356, this new video or video data derived based on this new video may be transmitted to the server as part of another login request. Such new video may be similarly pre-processed at the computing device to various extents, the details of which are similar to those described with reference to FIG. 3B and not repeated herein.

FIG. 4 is a flow diagram illustrating an exemplary process 400 related to video password based user authentication, consistent with exemplary aspects of at least some embodiments of the present disclosure. Referring to FIG. 4, the illustrative video password based user authentication process 400 may include: obtaining a trained video password authentication machine learning model that determines: 1) when current motion data of current visual input data matches baseline motion data; and 2) when current non-motion data of the current visual input data associated with the current motion data differs from non-motion data associated with the baseline motion data based on at least one authentication criterion, at 402; receiving a request to register a video password of a first user from a first computing device associated with the first user, the request comprising first video password data associated with the first user, the first video password data comprising first motion data and first non-motion data, at 404; establishing at least one user-specific authentication criterion for the first user based on the first video password data, at 406; receiving a login attempt from a second computing device associated with a second user who submits to be the first user, the login attempt comprising second video password data associated with the second user, the second video password data comprising second motion data and second non-motion data, at 408; utilizing the trained video password authentication machine learning model to determine: 1) a first comparison result when the second motion data of the second video password data matches the first motion data of the first video password data; and/or 2) a second comparison result when the second non-motion data of the second video password data differs from the first non-motion data of the first video password data based on the at least one user-specific authentication criterion associated with the first user, at 410; and performing one of: 1) accepting the second user as the first user and allowing the login attempt of the second user to access an account associated with the first user; and 2) rejecting the second user as the first user and denying the login attempt of the second user to access the account associated with the first user, at 412. In other embodiments, the video password based user authentication process 400 may be carried out, in whole or in part, in conjunction with a server, a transacting device, and/or a mobile device that is connected via one or more networks to the server, which is executing instructions for performing one or more steps or aspects of various embodiments described herein.

In some embodiments, the video password based user authentication process 400 may include, at 402, a step of video password authentication machine learning model that determines: 1) when current motion data of current visual input data matches baseline motion data; and 2) when current non-motion data of the current visual input data associated with the current motion data differs from non-motion data associated with the baseline motion data based on at least one authentication criterion. In some embodiments, the video password authentication machine learning model may be trained based at least in part on one or more of: (i) a first plurality of training video passwords established as user-specific authentication criteria for a first plurality of users, each of the first plurality of training video password having motion data and non-motion data; (ii) a second plurality of training video passwords associated with login attempts of the first plurality of users, each of the second plurality of training video password having motion data and non-motion data; (iii) a plurality of first comparison results and second comparison results associated with the login attempts by the first plurality of users using the second plurality of video passwords; (iv) a plurality of authentication results associated with the login attempts by the first plurality of users using the second plurality of video passwords; and (v) one or more of: profile information or contextual information of the first plurality of users, or metadata associated with the first plurality of training video passwords and/or the second plurality of training video passwords.

In some embodiments, the first and second plurality of training video passwords may include various raw video clips, and/or video data extracted or otherwise derived from raw video clips that contain visual input data representing motions performed by the first plurality of users and the non-motion data associated with the first plurality of users performing the motions. In some embodiments, the motions performed by the first plurality of users may be entirely or partially different from each other. In other embodiments, those motions may be similar for those users of the first plurality of users that have similar profile and/or contextual information. For instance, users of similar demographic backgrounds (e.g., ethnicity, age, geo-locations, etc.) may perform similar motions in the video clips utilized to register the user-specific authentication criteria. This way, the variations in motion data may be used to learn one or more of the threshold values of, for example, the first set of thresholds 236, according to the user demographic information. In various embodiments, the first and second plurality of training video passwords may include any types of non-motion data, not limited by examples illustrated herein.

According to various aspects of the disclosure, the video password authentication model may be further trained to: determine one or more variations between the current motion data and the baseline motion data, the current motion data considered as matching the baseline motion data; or determine one or more non-motion data in the current visual input data associated with the current motion data as the current non-motion data for comparing to the baseline non-motion data associated with the baseline motion data. In some embodiments, the video password authentication model may be applied to determine the at least one authentication criterion based at least in part on profile information or contextual information of a first plurality of users, the first plurality of users associated with the current visual input data.

According to some aspects of the disclosure, equipped with the vast amount of data corresponding to video password authentication, the exemplary trained video password authentication machine learning model may learn the threshold values associated with the first set of thresholds 236 and those associated with the second set of thresholds 246. In some embodiments, the values in each set of thresholds may be learned in relation to each other. For example, using the variations, detected between various motion data and the baseline motion data, that is associated with the accepted login attempts, the video password authentication model may learn, for example, the required similarity threshold value and/or the allowed dis-similarity threshold value of the first set of thresholds 236. Using the variations, detected between various motion data and the baseline motion data, that is associated with the rejected login attempts, the video password authentication model may learn, for example, the disallowed similarity threshold value and/or the allowed dis-similarity threshold value of the first set of thresholds 236. Similarly, in other examples, using the variations, detected between various non-motion data and baseline non-motion data, that is associated with the accepted login attempts, the video password authentication model may learn, for example, the required dis-similarity threshold value and/or the required similarity threshold value of the second set of thresholds 246. Using the variations, detected between various non-motion data and baseline non-motion data, that is associated with the rejected login attempts, the video password authentication model may learn, for example, the disallowed dis-similarity threshold value and/or the required similarity threshold value of the second set of thresholds 246. In some embodiments, the video password authentication model may be trained to determine an order and/or respective weights assigned to these threshold values associated with the first and second sets of thresholds.

In one embodiment, the video password authentication model may be trained such that it keeps a record of each object and background scene that has been associated with accepted login requests with video passwords. As a result, the video password authentication model may also be utilized to determine how to instruct the user to modify a video password as described with reference to FIG. 3C.

In some embodiments, the application of the above-described threshold values may be adjusted based on the user profile/contextual information. In one example, the profile/contextual information of the first user may indicate that the first user may have recorded the video data in his home. Subsequently, the contextual information of the first user may indicate that the first user has traveled and is staying at a hotel. In this scenario, when the second user attempts to login with a video password having a background scene similar to the one in the baseline video password (e.g., the first user's home), the login request may not be granted. On the other hand, if the second user attempts to login with a video password having a background scene depicting the inside of his hotel room (e.g., based on various transaction data available, the geo-location metadata associated with the videos/video data), the login request may be accepted even though the new non-motion data may differ from the baseline non-motion data in excess of the disallowed dis-similarity threshold of the second set of thresholds 246. In another example, the second user may be required to submit another video password by following updated instructions to, for example, perform the movement by holding an object he has brought on the trip (e.g., a pair of glasses, a piece of personal accessory, etc.) such that the new non-motion data may be compared with the baseline non-motion data again. In this example, since the second user has previously logged in with videos recording the same pair of glasses, the new non-motion data may be determined as also exhibiting a degree of similarity according to the required similarity threshold value of the second set of thresholds 246.

The user profile information may comprise information relating to one or more of: demographic information, account information, application usage information, any data provided by the user, any data provided on behalf of the user, and the like. The contextual aspect of the user profile information and user contextual information may comprise information relating to one or more of: a timing, a location of the user, an action of a user, calendar information of the user, contact information of the user, habits of the user, preferences of the user, purchase history of the user, browsing history of the user, communication history, travel history, on-line payment service history, profile and/or contextual information of individual(s) and entity(ies) the user is associated with, and the like. In some embodiments, the user profile information and/or user contextual information may be provided by the user, detected by a server (e.g., the server 101 of FIG. 1), and/or a component external thereto, or in a combination thereof.

In some embodiments, the video password authentication machine learning model may be trained via a server (e.g., the server 101 of FIG. 1), such as a processor of a computer platform, or an online computer platform. In some embodiments, the processor is associated with an entity that provides a financial service to the user. Here, for example, the at least one computer platform may comprise a financial service provider (FSP) system. This FSP system may comprise one or more servers and/or processors associated with a financial service entity that provides, maintains, manages, or otherwise offers financial services. Such financial service entity may include a bank, credit card issuer, or any other type of financial service entity that generates, provides, manages, and/or maintains financial service accounts for one or more customers. In other embodiments, the FSP system may outsource the training to a third-party model generator, or otherwise leverage the training video passwords associated with the registration, training video passwords associated with login requests, training authentication results, training user profile/contextual information, and/or trained models from a third-party data source, third-party machine learning model generators, and the like.

It should be further understood that, in some embodiments, the video password authentication machine learning model may be trained via a server in conjunction with a computing device of the user. Here, for example, the server may be configured to initially train a baseline video password authentication model based on the above-described training data of the first plurality of users (not including the user) and/or a plurality of such training data from the plurality of third-party data sources. Subsequently, the baseline video password authentication model may be transmitted to the computing device associated with the user to be trained with the particular training data of the user. In other words, a video password authentication model may be trained in various manners and orders as a user-specific model in implementations.

According to some aspects of the present disclosure, regardless of how the password authentication machine learning model is trained by the server alone, the computing device of the user alone, or in conjunction of both the server or the computing device of the user, the password authentication machine learning model may be further trained with user-specific training data. Similar to the training data described above, user specific training data may include various videos and video data submitted to register or modify video passwords, various videos and video data submitted as part of login requests, various metadata associated with these videos and video data, and various user profile and contextual information, all collected from the user's own communication with the server. Taking the example where the server is responsible for training the video password authentication model, the trained video password authentication model may be further trained (e.g., as part of the re-training, independent or in addition to re-training the model with training data associated with other users) to learn, for example, a user-specific first set of thresholds 236, a user-specific second set of thresholds 246, and/or an interrelationship between the two sets of thresholds. For example, for an elderly user, when the first comparison result may consistently indicate a lower degree of matching in motions, but the second comparison result may consistently indicate a higher degree of required difference and allowed similarity. As such, the video password authentication model may be further trained such that the required similarity threshold value of the first set of thresholds may be learned as a relatively lower, user-specific value as the elderly user may not be able to repeat the same movement with a high degree of similarity. Additionally or separately, the required dis-similarity value of the second set of thresholds may be learned as a relatively higher, user-specific value such that despite the lowered similarity required in motions, a heightened requirement in non-motion data may be imposed as a compensation mechanism.

The video password authentication process 400 may include, at 404, a step of receiving a request to register a video password of a first user from a first computing device associated with the first user, the request comprising first video password data associated with the first user, the first video password data comprising first motion data and first non-motion data. In some embodiments, the request may include a raw video and/or video data extracted from the raw video of the first user performing a movement. In some embodiments, an application executing on the first computing device associated with the first user may be configured to prompt the first user to perform a first motion that provides a video signature motion, via a camera of the first computing device, to generate the first video password data. In one embodiment, the first user may be prompted to perform the first motion with a physical object or with the physical object against a particular background. In some embodiments, the first motion data may include a three dimensional (3D) pattern. In some embodiments, the first video password data may be shared to the first user from another computing device. In this case, the shared video password data may be received from the other user, and in turn be included in the login request to register the same. In some embodiments, the other computing device may be associated with the first user. In this case, in addition to using the first computing device to capture the video data, the first user may utilize another computing device to capture the video/video data. In other embodiments, the other computing device may be associated with user other than the first user. In this case, the first user may register a video password on behalf of another user using the video data shared thereby.

The details are similar to those described with reference to FIGS. 2 and 3A, and not repeated herein. The request may be received at various communication channels suitable for registering the video password. For example, the request or part of the request may be received as an SMS message, an MMS message, an email message, a social media chat message, an application message, and the like.

The video password authentication process 400 may include, at 406, a step of establishing at least one user-specific authentication criterion for the first user based on the first video password data. In some implementation, the at least one user-specific authentication criterion for the first user may be stored in association with a user identification of the first user in a user profile as illustrated with reference to FIG. 2. The at least one user-specific authentication criterion may include various suitable information in various suitable format that represents the characteristics of the first user performing a particular movement, and/or the objects and background scenes captured in the video. For instance, the at least one user-specific authentication criterion may include a set of motion data represented as a set of motion data points, and a set of non-motion data represented as one or more physical object representations as well as one or more background scene representation(s). The details are similar to those described with reference to FIGS. 2 and 3A, and not repeated herein.

The video password authentication process 400 may include, at 408, a step of receiving a login attempt from a second computing device associated with a second user who submits to be the first user, the login attempt comprising second video password data associated with the second user, the second video password data comprising second motion data and second non-motion data. In some embodiments, an application executing on the second computing device associated with the second user may be configured to prompt the second user to perform a second motion, via a camera of the second computing device, to generate the second video password data. In one embodiment, the first user may be prompted to perform the first motion with a physical object or with the physical object against a particular background.

In some embodiments, the second computing device may be the same as the first computing device. In other embodiments, the second computing device may be a device different from the first computing device. Similar to the first video password, the second video password may be shared from another user to the second user such that the second user may also login on behalf of another user using the second video password. In some embodiments, the first motion data may include a three dimensional (3D) pattern. In some implementations, the login attempt or part of the login attempt may be received as an SMS message, an MMS message, an email message, a social media chat message, an application message, and the like.

The video password authentication process 400 may include, at 410, a step of utilizing the trained video password authentication machine learning model to determine: 1) a first comparison result when the second motion data of the second video password data matches the first motion data of the first video password data; and/or 2) a second comparison result when the second non-motion data of the second video password data differs from the first non-motion data of the first video password data based on the at least one user-specific authentication criterion associated with the first user. In some embodiments, the trained video password authentication model may include the motion data recognition model 234 and the non-motion data recognition model 244, as well as applied by the video password authentication engine 220. The details are similar to those described with reference to FIGS. 2 and 3B-3C, and not repeated herein.

In some embodiments, the video password authentication machine learning model may be applied to determine that the second non-motion data of the second video password data does not differ from the first non-motion data of the first video password data with required similarity. As a result, and in some embodiments, the application executing on the second computing device may be configured to prompt the second user to perform an action to modify the second video password data. For instance, the action may include the second user performing a motion with a physical object that differs from a physical object associated with the first video password data, and/or performs a motion against a background that differs from a background associated with the first video password data. In turn, such newly generated video/video data may be communicated and processed again to determine the first comparison result and/or the second comparison result.

In some embodiments, the video password authentication machine learning model may be applied to determine that the second motion data of the second video password data is not sufficiently similar to the first motion data of the first video password data with required dis-similarity. As a result, and in some embodiments, the application executing on the second computing device may be configured to prompt the second user to perform an action to modify the second video password data. In this case, the action may include the second user performing another movement by following the same instructions as followed in generating the previous second video password. In turn, such newly generated video/video data may be communicated and processed again to determine the first comparison result and/or the second comparison result.

The video password authentication process 400 may include, at 412, a step of performing one of: 1) accepting the second user as the first user and allowing the login attempt of the second user to access an account associated with the first user; and 2) rejecting the second user as the first user and denying the login attempt of the second user to access the account associated with the first user. In some embodiments, the first aspect and/or the second aspect of the step 412 may be based on one or both of the first comparison result and the second comparison result. In one example, when the first comparison result indicates a high confidence score of the second motion data matching the first motion data with a sufficient degree of variation allowed and mandated, the video password authentication process 400 may proceed to accepting the second user as the first user and allowing the login attempt of the second user to access an account associated with the first user without taking into account of the second comparison result, when, for example, the second non-motion data is not identical to the first non-motion data.

In some embodiments, when the second comparison result indicates a high confidence score of the second non-motion data differing from the first non-motion data with a sufficient degree of variation allowed and mandated, the video password authentication process 400 may also proceed to accepting the second user as the first user and allowing the login attempt of the second user to access an account associated with the first user without taking into account of the first comparison result, when, for example, the second motion data is not identical to (or un-acceptably different from) the first motion data.

Additionally or separately, in some embodiments, the video password authentication process 400 may determine an authentication result by considering both the first and second comparison results. For instance, a first comparison result indicating a weak match between the first motion data and the second motion data may be compensated by a second comparison result indicating a relatively more satisfying difference (e.g., according to the allowed and mandated degrees of variation) determined for the second non-motion data and the first non-motion data. In one embodiment as illustrated in the example of FIGS. 3B-3C, when not satisfied by either the first comparison result, the second comparison result, or the totality of both, the video password authentication process 400 may also proceed to instructing the second user to re-generate and submit another video password. In other embodiments, the video password authentication process 400 may also proceed to rejecting the second user as the first user and denying the login attempt of the second user to access the account associated with the first user.

At least some embodiments of the present disclosure may utilize and/or rely on one or more techniques described in U.S. Pat. No. 10,380,813, entitled "Systems and Methods for Using Motion Pattern of a User for Authentication," the contents of all of which are incorporated by reference in entirety.

Figure 5:
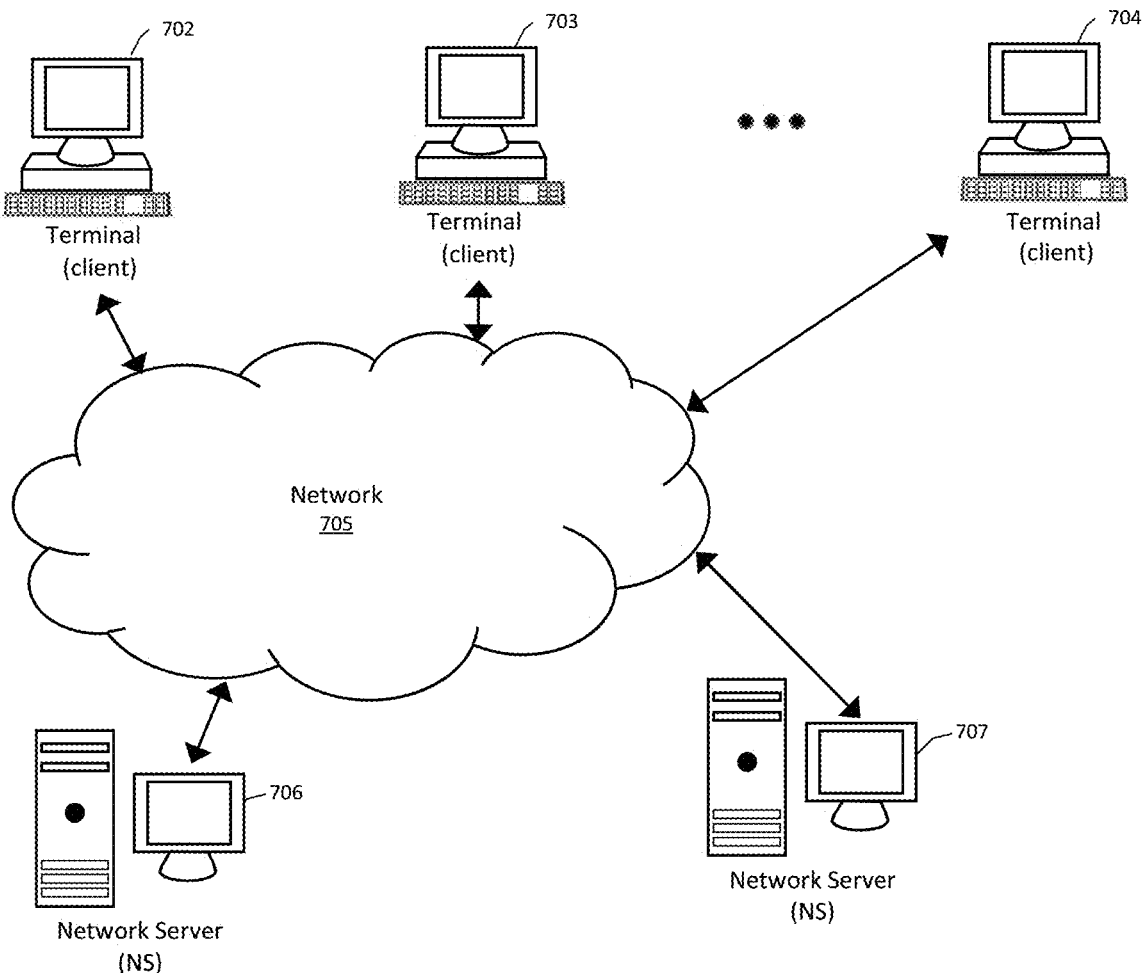
FIG. 5 is a block diagram depicting an exemplary computer-based system, in accordance with certain embodiments of the present disclosure.

FIG. 5 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of instances of software applications, users, and/or concurrent transactions, as detailed herein. In some embodiments, the exemplary computer-based system/platform may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 5, members 702-704 (e.g., clients) of the exemplary computer-based system/platform may include virtually any computing device capable of receiving and sending a message over a network (e.g., cloud network), such as network 705, to and from another computing device, such as servers 706 and 707, each other, and the like. In some embodiments, the member devices 702-704 may be configured to implement part of the entirety of the features and functionalities above-described for the computing device 180 of FIG. 1. In some embodiments, the servers 706 and 707 may be configured to implement part of the entirety of the features and functionalities above-described for the server 101 of FIG. 1. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using wireless communications media such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 5, in some embodiments, the exemplary server 706 or the exemplary server 707 may have connections to external systems like email, SMS messaging, text messaging, ad content sources, etc. Any of the features of the exemplary server 706 may also be implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
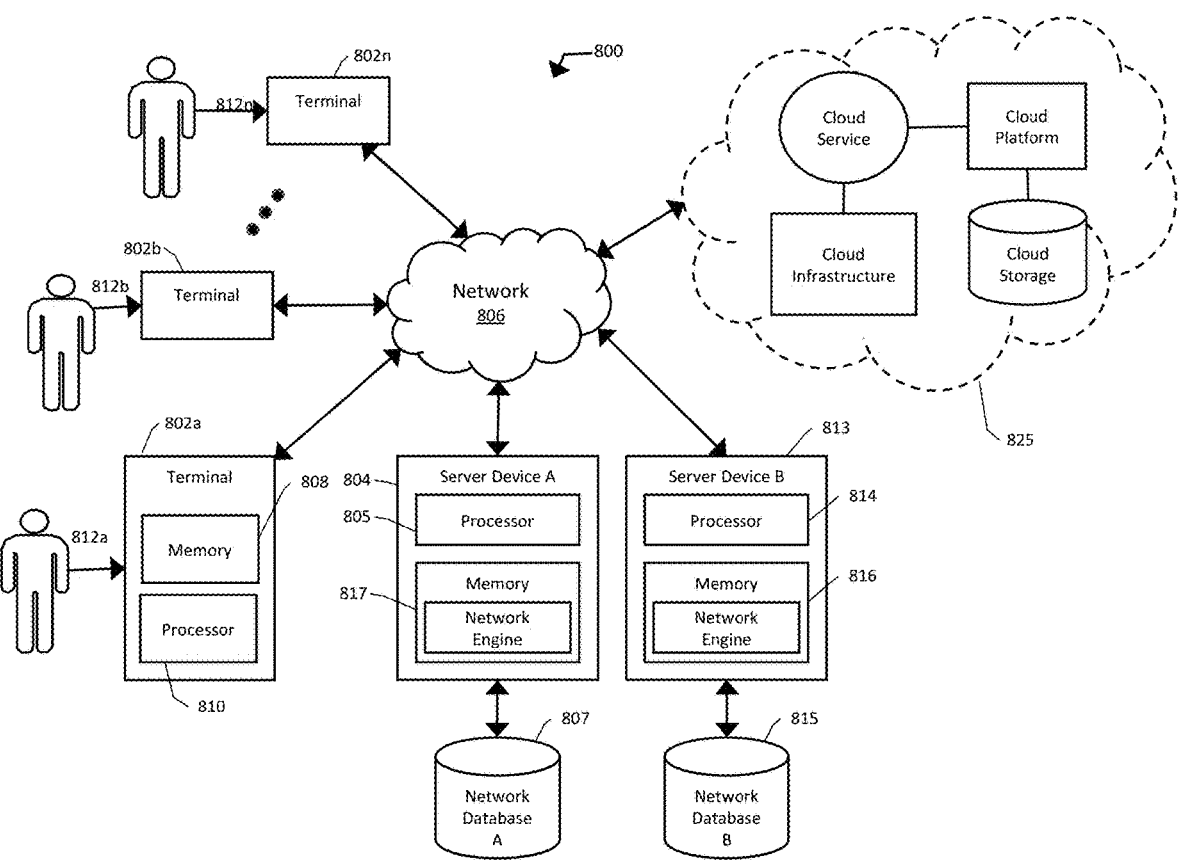
FIG. 6 is a block diagram depicting another exemplary computer-based system, in accordance with certain embodiments of the present disclosure.

FIG. 6 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices (e.g., clients) 802a, 802b through 802n shown each at least includes non-transitory computer-readable media, such as a random-access memory (RAM) 808 coupled to a processor 810 and/or memory 808. In some embodiments, the member computing devices 802a, 802b through 802n may be configured to implement part of the entirety of the features and functionalities above-described for the computing device 180 of FIG. 1. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable non-transitory media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a through 802n may also comprise a number of external or internal devices such as a mouse, a CD-ROM, DVD, a physical or virtual keyboard, a display, a speaker, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™, Windows™, and/or Linux. In some embodiments, member computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a through 802n, users, 812a through 812n, may communicate over the exemplary network 806 with each other and/or with other systems and/or devices coupled to the network 806.

As shown in FIG. 6, exemplary server devices 804 and 813 may be also coupled to the network 806. In some embodiments, one or more member computing devices 802a through 802n may be mobile clients. In some embodiments, the server devices 804 and 813 may be configured to implement part of the entirety of the features and functionalities above-described for the server 101 of FIG. 1. In some embodiments, server devices 804 and 813 shown each at least includes respective computer-readable media, such as a random-access memory (RAM) coupled to a respective processor 805, 814 and/or respective memory 817, 816. In some embodiments, the processor 805, 814 may execute computer-executable program instructions stored in memory 817, 816, respectively. In some embodiments, the processor 805, 814 may include a microprocessor, an ASIC, and/or a state machine. In some embodiments, the processor 805, 814 may include, or may be in communication with, media, for example computer-readable media, which stores instructions that, when executed by the processor 805, 814, may cause the processor 805, 814 to perform one or more steps described herein. In some embodiments, examples of computer-readable media may include, but are not limited to, an electronic, optical, magnetic, or other storage or transmission device capable of providing a processor, such as the respective processor 805, 814 of server devices 804 and 813, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
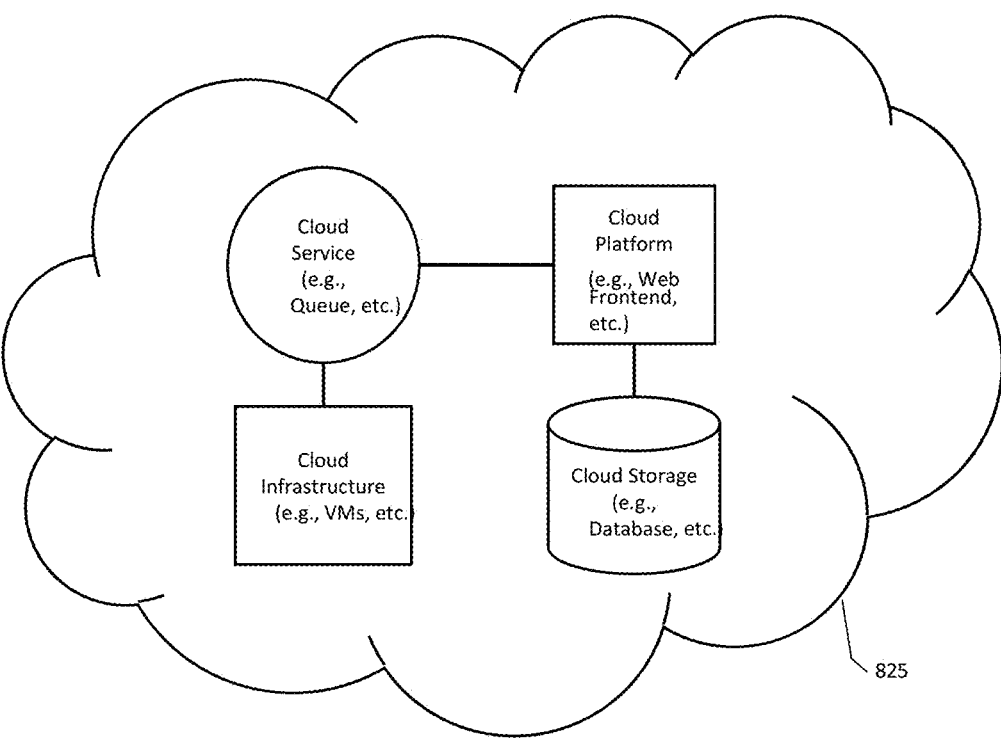
FIGS. 7 and 8 are diagrams illustrating two exemplary implementations of cloud computing architecture/aspects with respect to which the disclosed technology may be specifically configured to operate, in accordance with certain embodiments of the present disclosure.
Figure 8:
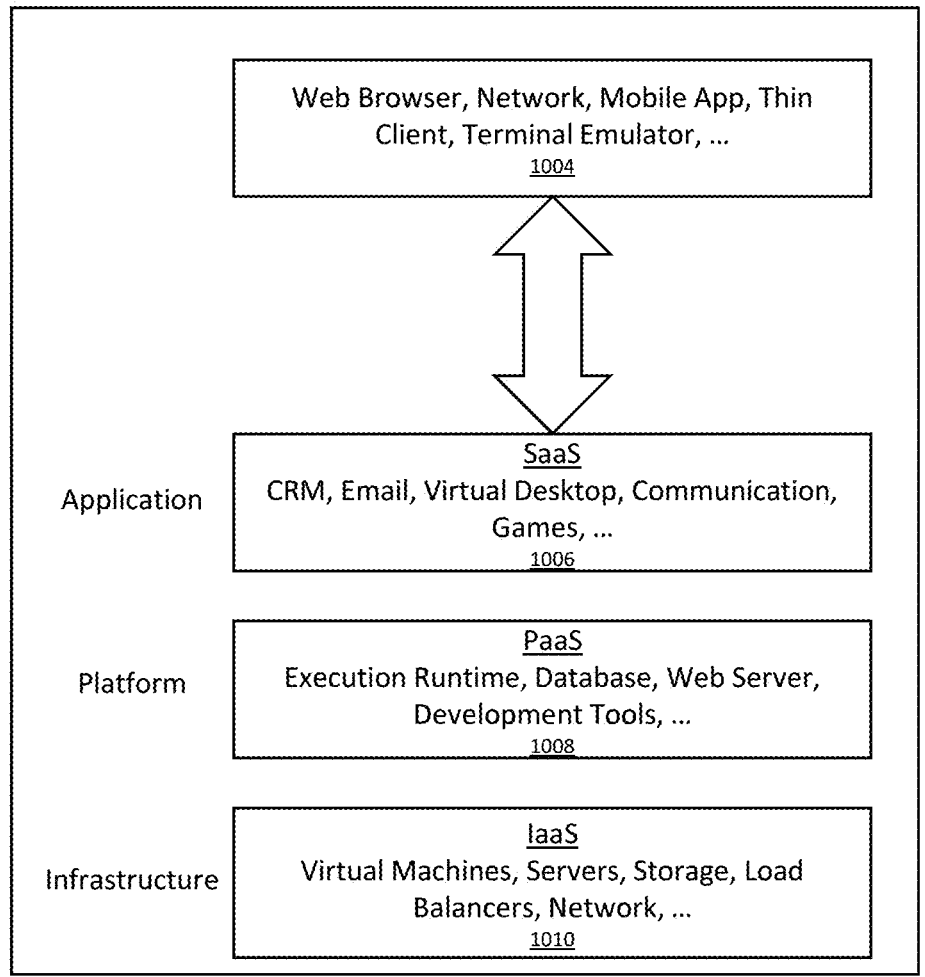

As also shown in FIGS. 7 and 8, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 8, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 7 and 8 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the Web browser and browser extension aspects, shown at 1004, to provide one or more technological solutions described herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices (e.g., the server 101, and/or the computing device 180 illustrated in FIG. 1) are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIG. 7-8) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile; TM (20) Microsoft DirectX™; (21).NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider/source. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A method including:

obtaining, by one or more processors, a trained video password authentication machine learning model that determines:

1) when current motion data of current visual input data matches baseline motion data, and 2) when current non-motion data of the current visual input data associated with the current motion data differs from non-motion data associated with the baseline motion data based on at least one authentication criterion;

receiving, by the one or more processors, a request to register a video password of a first user from a first computing device associated with the first user, the request comprising first video password data associated with the first user, the first video password data comprising:

1) first motion data, and 2) first non-motion data;

establishing, by the one or more processors, at least one user-specific authentication criterion for the first user based on the first video password data;

receiving, by the one or more processors, a login attempt from a second computing device associated with a second user who submits to be the first user, the login attempt comprising second video password data associated with the second user, the second video password data comprising:

1) second motion data, and 2) second non-motion data;

utilizing, by the one or more processors, the trained video password authentication machine learning model to:

1) determine a first comparison result when the second motion data of the second video password data matches the first motion data of the first video password data, and 2) determine a second comparison result when the second non-motion data of the second video password data differs from the first non-motion data of the first video password data based on the at least one user-specific authentication criterion associated with the first user; and performing, by the one or more processors, one of:

1) accepting the second user as the first user and allowing the login attempt of the second user to access, via the second computing device, an account associated with the first user, based on:

i) the first comparison result or ii) the first comparison result and the second comparison result, 2) rejecting the second user as the first user and denying the login attempt of the second user to access, via the second computing device, the account associated with the first user, based on:

i) the first comparison result or ii) the first comparison result and the second comparison result.

Clause 2. The method of clause 1 or any clause herein, where the video password authentication model is further trained to:

determine one or more variations between the current motion data and the baseline motion data, the current motion data considered as matching the baseline motion data; or determine one or more non-motion data in the current visual input data associated with the current motion data as the current non-motion data for comparing to the baseline non-motion data associated with the baseline motion data; or determining the at least one authentication criterion based at least in part on profile information or contextual information of a first plurality of users, the first plurality of users associated with the current visual input data.

Clause 3. The method of clause 1 or any clause herein, further including:

instructing, by the one or more processors, an application execution on the first computing device associated with the first user to prompt the first user to perform a first motion that provides a video signature motion, via a camera of the first computing device, to generate the first video password data; or instructing, by the one or more processors, an application execution on the second computing device associated with the second user to prompt the second user to perform a second motion, via a camera of the second computing device, to generate the second video password data.

Clause 4. The method of clause 3 or any clause herein, where one or both of the first motion and second motion comprise a three dimensional (3D) pattern.

Clause 5. The method of clause 3 or any clause herein, where the first user is prompted to perform the first motion with a physical object or with the physical object against a particular background.

Clause 6. The method of clause 1 or any clause herein, further including:

utilizing, by the one or more processors, the video password authentication machine learning model to determine that the second non-motion data of the second video password data does not differ from the first non-motion data of the first video password data; and instructing, by the one or more processors, an application execution on the second computing device associated with the second user to prompt the second user to perform an action to modify the second video password data.

Clause 7. The method of clause 6 or any clause herein, where the action comprises the second user performs a motion with a physical object that differs from a physical object associated with the first video password data, or performs a motion against a background that differs from a background associated with the first video password data.

Clause 8. The method of clause 1 or any clause herein, where one or both of the first video password and the second video password are transmitted to the one or more processors via a SMS service.

Clause 9. The method of clause 1 or any clause herein, where one or both of the first video password and the second video password are sharable with another user.

Clause 10. The method of clause 1 or any clause herein, where one or both of the first video password data and the second video password data is recorded in respective videos captured by the first computing device associated with the first user and the second computing device associated with the second user, respectively.

Clause 11. The method of clause 10 or any clause herein, where the respective videos are processed such that to: 1) extract a set motion data points to generate respective motion data; and 2) represent respective non-motion data in a format that reduces a size of a data structure storing respective representation of the respective non-motion data.

Clause 12. The method of clause 11 or any clause herein, where the format comprises a grey style video, a grey style image frame, a black and white video, or a black and white image frame.

Clause 13. A system comprising:
one or more processors; and
a memory in communication with the one or more processors and storing instructions that, when executed by the one or more processors, cause the one or more processors to:

obtain a trained video password authentication machine learning model that determines:
1) when current motion data of current visual input data matches baseline motion data, and
2) when current non-motion data of the current visual input data associated with the current motion data differs from non-motion data associated with the baseline motion data based on at least one authentication criterion;

receive a request to register a video password of a first user from a first computing device associated with the first user, the request comprising first video password data associated with the first user, the first video password data comprising:
1) first motion data, and
2) first non-motion data;

establish at least one user-specific authentication criterion for the first user based on the first video password data;

receive a login attempt from a second computing device associated with a second user who submits to be the first user, the login attempt comprising second video password data associated with the second user, the second video password data comprising:
1) second motion data, and
2) second non-motion data;

utilize the trained video password authentication machine learning model to:
3) determine a first comparison result when the second motion data of the second video password data matches the first motion data of the first video password data, and
4) determine a second comparison result when the second non-motion data of the second video password data differs from the first non-motion data of the first video password data based on the at least one user-specific authentication criterion associated with the first user; and perform one of:
3) accepting the second user as the first user and allowing the login attempt of the second user to access, via the second computing device, an account associated with the first user, based on:
i) the first comparison result or
ii) the first comparison result and the second comparison result,
4) rejecting the second user as the first user and denying the login attempt of the second user to access, via the second computing device, the account associated with the first user, based on:
i) the first comparison result or
ii) the first comparison result and the second comparison result.

Clause 14. The system of clause 13 or any clause herein, where the video password authentication model is further trained to:
determine one or more variations between the current motion data and the baseline motion data, the current motion data considered as matching the baseline motion data; or determine one or more non-motion data in the current visual input data associated with the current motion data as the current non-motion data for comparing to the baseline non-motion data associated with the baseline motion data; or determining the at least one authentication criterion based at least in part on profile information or contextual information of a first plurality of users, the first plurality of users associated with the current visual input data.

Clause 15. The system of claim 13 or any clause herein, where the instructions further cause the one or more processors to:

instruct an application execution on the first computing device associated with the first user to prompt the first user to perform a first motion that provides a video signature motion, via a camera of the first computing device, to generate the first video password data; or instruct an application execution on the second computing device associated with the second user to prompt the second user to perform a second motion, via a camera of the second computing device, to generate the second video password data.

Clause 16. The system of claim 15 or any clause herein, where one or both of the first motion and second motion comprise a three dimensional (3D) pattern.

Clause 17. The system of claim 15 or any clause herein, where the first user is prompted to perform the first motion with a physical object or with the physical object against a particular background.

Clause 18. The system of claim 13 or any clause herein, where the instructions further cause the one or more processors to:

utilize the video password authentication machine learning model to determine that the second non-motion data of the second video password data does not differ from the first non-motion data of the first video password data; and instruct an application execution on the second computing device associated with the second user to prompt the second user to perform an action to modify the second video password data.

Clause 19. A non-transitory computer readable storage medium for tangibly storing computer program instructions capable of being executed by a computer processor, the computer program instructions defining the steps of:

obtaining, by one or more processors, a trained video password authentication machine learning model that determines:

1) when current motion data of current visual input data matches baseline motion data, and 2) when current non-motion data of the current visual input data associated with the current motion data differs from non-motion data associated with the baseline motion data based on at least one authentication criterion;

receiving, by the one or more processors, a request to register a video password of a first user from a first computing device associated with the first user, the request comprising first video password data associated with the first user, the first video password data comprising:

1) first motion data, and 2) first non-motion data;

establishing, by the one or more processors, at least one user-specific authentication criterion for the first user based on the first video password data;

receiving, by the one or more processors, a login attempt from a second computing device associated with a second user who submits to be the first user, the login attempt comprising second video password data associated with the second user, the second video password data comprising:

1) second motion data, and 2) second non-motion data;

utilizing, by the one or more processors, the trained video password authentication machine learning model to:

1) determine a first comparison result when the second motion data of the second video password data matches the first motion data of the first video password data, and 2) determine a second comparison result when the second non-motion data of the second video password data differs from the first non-motion data of the first video password data based on the at least one user-specific authentication criterion associated with the first user; and performing, by the one or more processors, one of:

accepting the second user as the first user and allowing the login attempt of the second user to access, via the second computing device, an account associated with the first user, based on:

i) the first comparison result, or ii) the first comparison result and the second comparison result, rejecting the second user as the first user and denying the login attempt of the second user to access, via the second computing device, the account associated with the first user, based on:

i) the first comparison result, or ii) the first comparison result and the second comparison result.

Clause 20. The computer readable storage medium of clause 19 or any clause herein, where the video password authentication model is further trained to:

determine one or more variations between the current motion data and the baseline motion data, the current motion data considered as matching the baseline motion data; or determine one or more non-motion data in the current visual input data associated with the current motion data as the current non-motion data for comparing to the baseline non-motion data associated with the baseline motion data; or determining the at least one authentication criterion based at least in part on profile information or contextual information of a first plurality of users, the first plurality of users associated with the current visual input data.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:

obtaining, by one or more processors, current visual input data that comprises:

motion data that matches baseline motion data, and non-motion data that differs from the baseline motion data based on at least one authentication criterion;

receiving, by the one or more processors, a request to register a password of a first user from a first computing device, the request comprising first password data associated with the first user;

establishing, by the one or more processors, at least one user-specific authentication criterion for the first user based on:

the first password data, and the current visual input data; and registering, by the one or more processors, the password of the first user in association with the at least one user-specific authentication criterion.

2. The method of claim 1, further comprising:

receiving a login attempt from a second computing device associated with a second user, the login attempt comprising second password data associated with the second user;

determining a comparison result when motion data of the second password data matches the motion data of the first password data; and allowing the second user to access, via the second computing device, an account associated with the first user, based on the comparison result.

3. The method of claim 1, further comprising:

determining one or more variations between the motion data and the baseline motion data, the motion data considered as matching the baseline motion data;

determining one or more non-motion data in the current visual input data associated with the motion data as the non-motion data for comparing to the baseline motion data; or determining the at least one authentication criterion based at least in part on profile information of the first user.

4. The method of claim 1, further comprising:

instructing, by the one or more processors, an application executing on the first computing device associated with the first user to prompt the first user to perform a first motion that provides a video signature motion, via a camera of the first computing device, to generate the first password data; or instructing, by the one or more processors, an application executing on a second computing device associated with the second user to prompt the second user to perform a second motion, via a camera of the second computing device, to generate the second video password data.

5. The method of claim 4, wherein one or both of the first motion and the second motion comprise a three-dimensional (3D) pattern.

6. The method of claim 4, wherein the first user is prompted to perform the first motion with a physical object or with the physical object against a particular background.

7. The method of claim 1, further comprising:

utilizing, by the one or more processors, a video password authentication machine learning model to determine that a second non-motion data of the second password data does not differ from the first non-motion data of the first password data; and instructing, by the one or more processors, an application executing on a second computing device associated with a second user to prompt the second user to perform an action to modify the second password data.

8. The method of claim 7, wherein the action comprises the second user performing a motion with a physical object that differs from a physical object associated with the first password data, or performing a motion against a background that differs from a background associated with the first password data.

9. The method of claim 2, wherein one or both of the first password data and the second password data are transmitted to the one or more processors via a SMS service.

10. The method of claim 2, wherein one or both of the first password data and the second password data are sharable with another user.

11. The method of claim 2, wherein one of the first password data and the second password data is captured by the first computing device associated with the first user and the second computing device associated with the second user, respectively.

12. The method of claim 11, wherein the first password data and the second password data are processed to:

extract a set of motion data points to generate respective motion data; and represent respective non-motion data in a format that reduces a size of a data structure storing respective representation of the respective non-motion data.

13. The method of claim 12, wherein the format comprises a grey style video, a grey style image frame, a black and white video, or a black and white image frame.

14. A system comprising:

one or more processors; and a memory in communication with the one or more processors and storing instructions that, when executed by the one or more processors, cause the one or more processors to:

obtain motion data of current visual input data that matches baseline motion data, and non-motion data of the current visual input data that differs from the baseline motion data based on at least one authentication criterion;

receive a request to register a password of a first user from a first computing device, the request comprising first password data associated with the first user;

establish a user-specific authentication criterion for the first user based on the first password data;

receive a login attempt from a second computing device associated with a second user, the login attempt comprising second password data associated with the second user;

determine a comparison result when a second motion data of the second password data differs from the non-motion data of the first password data based on the user-specific authentication criterion associated with the first user; and deny the login attempt of the second user to access, via the second computing device, an account associated with the first user based on the comparison result.

15. The system of claim 14, wherein the instructions further cause the one or more processors to:

determine one or more variations between the motion data and the baseline motion data, the motion data considered as matching the baseline motion data;

determine one or more non-motion data in the current visual input data associated with the motion data as the non-motion data for comparing to the baseline motion data; or determining the at least one authentication criterion based at least in part on profile information of the first user.

16. The system of claim 14, wherein the instructions further cause the one or more processors to:

instruct an application executing on the first computing device to prompt the first user to perform a first motion that provides a video signature motion, via a camera of the first computing device, to generate the first password data; or instruct an application executing on the second computing device associated with the second user to prompt the second user to perform a second motion, via a camera of the second computing device, to generate the second password data.

17. The system of claim 16, wherein one or both of the first motion and second motion comprise a three-dimensional (3D) pattern.

18. The system of claim 16, wherein the first user is prompted to perform the first motion with a physical object or with the physical object against a particular background.

19. The system of claim 14, wherein the instructions further cause the one or more processors to:

utilize a video password authentication machine learning model to determine that the non-motion data of the second password data does not differ from the non-motion data of the first password data; and instruct an application executing on the second computing device associated with the second user to prompt the second user to perform an action to modify the second password data.

20. A non-transitory computer readable storage medium for tangibly storing computer program instructions capable of being executed by a computer processor, the computer program instructions defining steps of:

obtaining, by one or more processors, motion data of current visual input data that matches baseline motion data and non-motion data of the current visual input data that differs from the baseline motion data based on at least one authentication criterion;

receiving, by the one or more processors, a request to register a password of a first user from a first computing device, the request comprising first password data associated with the first user;

establishing, by the one or more processors, a user-specific authentication criterion for the first user based on the first password data;

receiving, by the one or more processors, a login attempt from a second computing device associated with a second user;

determining a comparison result when the motion data of a second password data matches the motion data of the first password data based on the user-specific authentication criterion associated with the first user; and allowing the login attempt of the second user to access, via the second computing device, an account associated with the first user based on the comparison result.

\* \* \* \* \*